United States Patent
Nam et al.

(10) Patent No.: US 11,441,900 B2
(45) Date of Patent: *Sep. 13, 2022

(54) MOVABLE MARKING SYSTEM, CONTROLLING METHOD FOR MOVABLE MARKING APPARATUS, AND COMPUTER READABLE RECORDING MEDIUM

(71) Applicant: LANDOR ARCHITECTURE, INC., Seoul (KR)

(72) Inventors: Han Seok Nam, Seoul (KR); Dongjun Lee, Seoul (KR)

(73) Assignee: LANDOR ARCHITECTURE, INC., Seoul (KR)

( * ) Notice: Subject to any disclaimer, the term of this patent is extended or adjusted under 35 U.S.C. 154(b) by 98 days.

This patent is subject to a terminal disclaimer.

(21) Appl. No.: 17/009,464

(22) Filed: Sep. 1, 2020

(65) Prior Publication Data

US 2020/0400431 A1 Dec. 24, 2020

Related U.S. Application Data

(63) Continuation of application No. 16/439,191, filed on Jun. 12, 2019, now Pat. No. 10,794,697, which is a
(Continued)

(30) Foreign Application Priority Data

May 19, 2017 (KR) .................. 10-2017-0062392

(51) Int. Cl.
  *G06C 15/06* (2006.01)
  *G01C 15/06* (2006.01)
  (Continued)

(52) U.S. Cl.
  CPC ........... *G01C 15/06* (2013.01); *G01C 15/006* (2013.01); *G01C 21/005* (2013.01); *G01C 25/00* (2013.01);

(58) Field of Classification Search
  CPC .... G01C 15/06; G01C 15/006; G01C 21/005; G01C 25/00; B41J 2/475; B41J 29/393; B41M 5/26
  See application file for complete search history.

(56) References Cited

U.S. PATENT DOCUMENTS 2,480,208 A   8/1949  Alvarez
4,379,427 A   4/1983  Middel et al.
(Continued)

FOREIGN PATENT DOCUMENTS

EP   1034935 A1    9/2000
JP   1996-110229 A  4/1996
(Continued)

OTHER PUBLICATIONS

Cesare Rossi et al. "A Robotic System to Scan and Reproduce Object", Journal of Robotics, vol. 2011, Article ID 168481. 2011, 11 pages.
(Continued)

*Primary Examiner* — Tung S Lau
(74) *Attorney, Agent, or Firm* — Novick, Kim & Lee, PLLC; Jae Youn Kim

(57) ABSTRACT

Provided are a movable marking system, a method of controlling a movable marking apparatus, and a computer-readable recording medium. The movable marking system is a movable marking system that includes a movable marking apparatus, and includes: a data receiving unit for receiving marking data regarding a working surface; a marking unit for performing a marking operation on the working surface in response to the marking data; a sensing unit for scanning space targeted for scanning; and a scan condition setting unit for setting a movement path of the movable marking apparatus corresponding to the marking data, setting a scan position for scanning the space targeted for scanning by taking into account reference map data corresponding to the
(Continued)

space targeted for scanning, and setting a scan angle of the sensing unit at the scan position.

15 Claims, 12 Drawing Sheets

Related U.S. Application Data continuation of application No. 16/100,815, filed on Aug. 10, 2018, now Pat. No. 10,365,101, which is a continuation of application No. PCT/KR2018/005669, filed on May 17, 2018.

(51) Int. Cl.
*G01C 25/00* (2006.01)
*G01C 15/00* (2006.01)
*G01C 21/00* (2006.01)

(56) References Cited

U.S. PATENT DOCUMENTS

| | | | |
|---|---|---|---|
| 6,023,537 A | 2/2000 | Wada et al. | |
| 6,324,469 B1* | 11/2001 | Okude | G01C 21/3638 |
| | | | 345/441 |
| 6,666,857 B2 | 12/2003 | Smith | |
| 7,912,583 B2* | 3/2011 | Gutmann | G06V 20/10 |
| | | | 700/258 |
| 8,733,877 B2 | 5/2014 | Inoue | |
| 9,507,995 B2* | 11/2016 | Konolige | G06T 7/521 |
| 10,136,510 B2 | 11/2018 | Nagai et al. | |
| 10,293,598 B2 | 5/2019 | Nam | |
| 10,455,212 B1* | 10/2019 | Konolige | H04N 13/122 |
| 2005/0025554 A1 | 2/2005 | Inaba | |
| 2006/0025888 A1* | 2/2006 | Gutmann | G06T 7/593 |
| | | | 700/253 |
| 2006/0280358 A1 | 12/2006 | Ishikawa | |
| 2008/0212120 A1 | 9/2008 | Mealy et al. | |
| 2008/0262719 A1 | 10/2008 | Bledsoe et al. | |
| 2009/0040309 A1* | 2/2009 | Ishii | G08B 13/19645 |
| | | | 348/E7.085 |
| 2009/0060283 A1 | 3/2009 | Bledsoe et al. | |
| 2009/0314414 A1 | 12/2009 | Verschuuren et al. | |
| 2011/0141175 A1 | 6/2011 | Murray et al. | |
| 2011/0178669 A1 | 7/2011 | Nakano et al. | |
| 2011/0267340 A1 | 11/2011 | Bock et al. | |
| 2013/0187970 A1 | 7/2013 | Inoue | |
| 2016/0063309 A1* | 3/2016 | Konolige | G06T 7/593 |
| | | | 901/14 |
| 2016/0318182 A1 | 11/2016 | Chin et al. | |
| 2019/0184697 A1 | 6/2019 | Nam | |

FOREIGN PATENT DOCUMENTS

| | | |
|---|---|---|
| JP | 2003-515210 A | 4/2003 |
| JP | 2007-021613 A | 2/2007 |
| JP | 2013-147003 A | 8/2013 |
| KR | 10-2008-0029679 A | 4/2008 |
| KR | 10-2009-0088516 A | 8/2009 |
| KR | 10-2010-0045585 A | 5/2010 |
| WO | 01/37060 A1 | 5/2001 |
| WO | 2015/002351 A1 | 1/2015 |

OTHER PUBLICATIONS

Tom Duckett et al. "Mobile robot self-localization using occupancy histograms and mixture of Gaussian location hypotheses", Robotics and Autonomous Systems 34 (2001), pp. 117-129.
Sebastian Thrun et al. "A Real-Time Algorithm for Mobile Robot Mapping With Applications to Multi-Robot and 3d Mapping", IEEE International Conference on Robotics and Automation, Apr. 2000, 8 pages.

* cited by examiner

FIG. 5
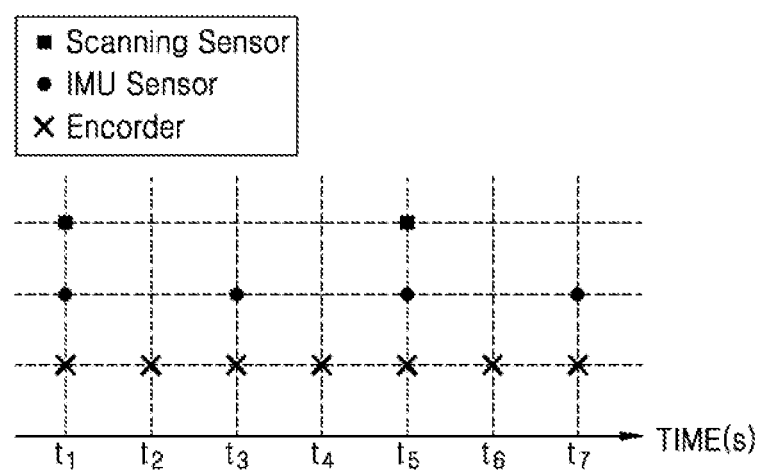
FIG. 6A
FIG. 6B
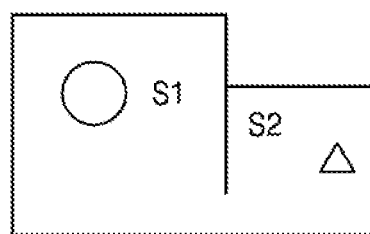
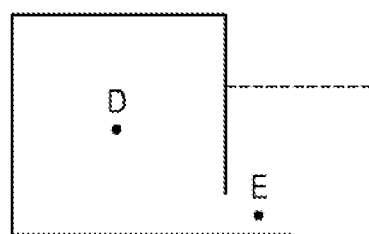

MOVABLE MARKING SYSTEM, CONTROLLING METHOD FOR MOVABLE MARKING APPARATUS, AND COMPUTER READABLE RECORDING MEDIUM

CROSS-REFERENCE TO RELATED APPLICATIONS

The instant application is a continuation application of U.S. application Ser. No. 16/439,191 filed on Jun. 12, 2019, which is a continuation application of U.S. application Ser. No. 16/100,815 filed on Aug. 10, 2018, which is a continuation of PCT international application No. PCT/KR2018/005669 filed on May 17, 2018, and claims priority to Korean patent application No. 10-2017-0062392 filed on May 19, 2017, the entire disclosures of which are hereby incorporated by reference.

TECHNICAL FIELD

The disclosure relates to a movable marking system, a controlling method for a movable marking apparatus, and a computer-readable recording medium, and more particularly, to a movable marking system capable of correcting its position in space on its own by using a laser scan signal, a controlling method for a movable marking apparatus, and a computer-readable recording medium.

BACKGROUND ART

Limits and/or problems between drawings and actual analysis thereof occur not only in construction sites of building and/or engineering work but also in a case of marking particular content on a working surface. That is, in order to mark particular content, such as an advertisement, on the working surface, a worker has to see a original drawing and manually mark it on the working surface, meaning that every work depends on the proficiency of the worker. In this case, accuracy deteriorates, and if the same content is repeatedly marked, the problem worsens. Such the problem may occur not only in the construction field but also in other fields, such as heavy industry, city planning, and the like, which require marking according to position measurement.

In addition, when work is done by using a machine/robot, the working machine/robot is required to have a function of identifying its accurate position on its own.

DESCRIPTION OF EMBODIMENTS

Technical Problem

Provided is a movable marking system capable of determining an environment of space targeted for scanning or space targeted for work and accurately determining its position, a method of controlling a movable marking apparatus, and a computer-readable recording medium.

Solution to Problem

According to an aspect of the disclosure, a movable marking system including a movable marking apparatus includes: a data receiving unit for receiving information regarding space targeted for scanning; a driver for providing power to the movable marking apparatus; a sensing unit for scanning the space targeted for scanning; a scan condition setting unit for setting a movement path of the movable marking apparatus, setting a scan position for scanning the space targeted for scanning by taking into account reference map data corresponding to the space targeted for scanning, and setting a scan angle of the sensing unit at the scan position; and a position detecting unit for detecting a position of the movable marking apparatus by comparing scan data obtained through the sensing unit at the scan position with the reference map data.

The movable marking system may further include a map generating unit for generating the reference map data from scan data obtained through the sensing unit at a reference position.

The reference map data may be generated from a drawing corresponding to the space targeted for scanning.

The movable marking system may further include a position correcting unit for correcting the position of the movable marking apparatus by comparing the position of the movable marking apparatus detected in the position detecting unit with the movement path.

When the position of the movable marking apparatus is off the movement path by a predetermined range or more, the position correcting unit may correct the position of the movable marking apparatus so as to correspond to the movement path.

The movable marking system may further include a control unit for controlling the movable marking apparatus and a position of a marking unit, wherein, when the position of the movable marking apparatus detected in the position detecting unit is off the movement path by a predetermined range or more, the control unit may adjust the position of the movable marking apparatus in response to the movement path, and when the position of the movable marking apparatus is off the movement path by less than the predetermined range, the control unit may adjust the position of the marking unit in response to the movement path.

The scan position may be on the movement path.

The movable marking system may further include a marking unit for performing a marking operation corresponding to marking data regarding a working surface, wherein the movement path of the movable marking apparatus may be set in response to the marking data.

The position detecting unit may receive a position signal from a transceiver in an arbitrary position and may determine the position of the movable marking apparatus from the position signal.

The position detecting unit may determine the position of the marking unit by comparing the marking data with data corresponding to an operation result of the marking unit, and may determine the position of the movable marking apparatus by taking into account a distance between the movable marking apparatus and the marking unit.

According to another aspect of the disclosure, a movable marking system including a movable marking apparatus includes: a data receiving unit for receiving information regarding space targeted for scanning; a driver for providing power to the movable marking apparatus; a sensing unit for scanning the space targeted for scanning; and a position detecting unit for detecting a position of the movable marking apparatus by comparing reference map data corresponding to the space targeted for scanning with scan data obtained in the sensing unit.

The position detecting unit may extract some scan data from the entire scan data obtained through the sensing unit and compare the some scan data with the reference map data, wherein the some scan data may be extracted by taking into account an amount of information regarding the space targeted for scanning at a position where the corresponding scan data was obtained.

The position detecting unit may determine a scan position and a scan angle range at the scan position by taking into account an amount of information obtainable with respect to the space targeted for scanning, and may extract scan data corresponding to the determined scan position and scan angle and compare the scan data with the reference map data.

According to another aspect of the disclosure, a method of controlling a movable marking apparatus including a rotatable scanning sensor and a driving apparatus includes: receiving information regarding space targeted for scanning; setting a movement path of the movable marking apparatus; setting a scan position for scanning the space targeted for scanning by taking into account characteristics of an object in the space targeted for scanning, which are obtained from reference map data corresponding to the space targeted for scanning, and setting a scan angle of the scanning sensor at the scan position; and determining a position of the movable marking apparatus by comparing scan data obtained through the scanning sensor at the scan position with the reference map data.

The method may further include comparing the position of the movable marking apparatus with the movement path and correcting the position of the movable marking apparatus, wherein the correcting of the position of the movable marking apparatus may include correcting, when the position of the movable marking apparatus determined in the determining of the position is off the movement path by a predetermined range or more, the position of the movable marking apparatus so as to correspond to the movement path.

The receiving of the information regarding the space targeted for scanning may include receiving marking data regarding a working surface included in the space targeted for scanning, and the setting of the movement path may include setting the movement path of the movable marking apparatus in response to the marking data.

The method may further include: obtaining scan data of the space targeted for scanning by rotating the scanning sensor at a reference position; and generating the reference map data of the space targeted for scanning from the scan data.

The reference map data may be generated from a drawing corresponding to the space targeted for scanning.

The scan position may be on the movement path.

Meanwhile, a computer-readable recording medium having recorded thereon a program for performing a method of controlling a movable marking apparatus according to the disclosure may be provided.

Advantageous Effects of Disclosure

The disclosure may provide a movable marking system capable of determining an environment of space targeted for scanning or space targeted for work and accurately determining its position, a method of controlling a movable marking apparatus, and a computer-readable recording medium.

BRIEF DESCRIPTION OF DRAWINGS

FIG. 5 illustrates an example of a data obtaining cycle through a scanning sensor, an inertial measurement unit (IMU), and an encoder.

FIGS. 6A and 6B illustrate an example of a process of performing marking work by comparing a prior map with scan data.

MODE OF DISCLOSURE

Advantages and features of the disclosure and methods of accomplishing the same may be understood more readily by reference to the following detailed description of embodiments and the accompanying drawings. However, the disclosure may be embodied in many different forms and should not be construed as being limited to the embodiments set forth herein, and it is to be appreciated that all changes, equivalents, and substitutes that do not depart from the spirit and technical scope of the disclosure are encompassed in the disclosure. The embodiments set forth herein are provided so that this disclosure may be thorough and complete and may fully convey the scope of the disclosure to one of ordinary skill in the art. In the description of the disclosure, certain detailed explanations of the related art are omitted when it is deemed that they may unnecessarily obscure the essence of the disclosure.

The terms used herein are merely used to describe embodiments and are not intended to limit the disclosure. An expression used in the singular encompasses the expression of the plural, unless it has a clearly different meaning in the context. In the present specification, it is to be understood that the terms such as "include" and "comprise" are intended to indicate the existence of features, numbers, steps, actions, components, parts, or combinations thereof described in the specification and are not intended to preclude the possibility that one or more other features, numbers, steps, actions, components, parts, or combinations thereof may exist or may be added. While such terms as "first" and "second" may be used to describe various components, such components must not be limited to the above terms. The above terms are used only to distinguish one component from another.

Figure 1:
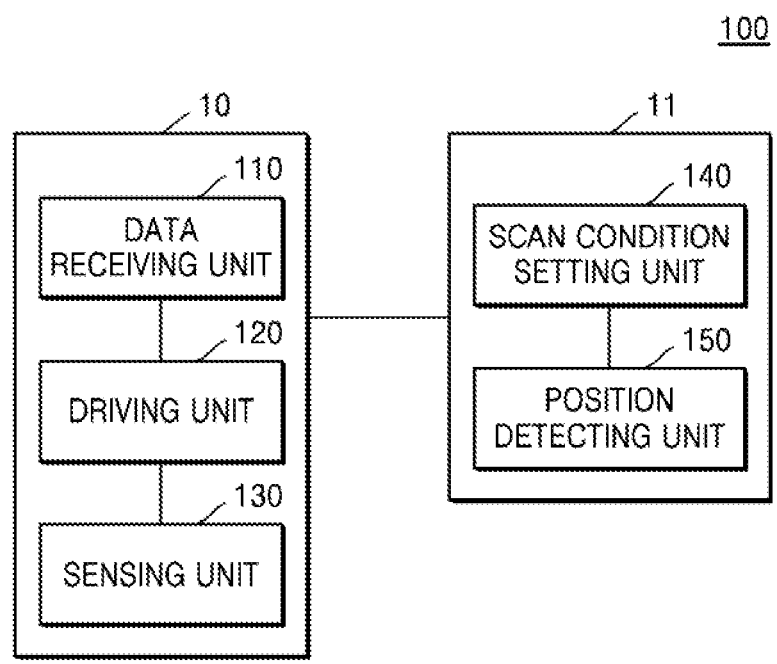
FIG. 1 schematically illustrates configurations of a movable marking system according to an embodiment of the disclosure.

Referring to FIG. 1, a movable marking system 100 according to an embodiment of the disclosure may include a movable marking apparatus 10, and taken as a whole, may include a data receiving unit 110, a driving unit 120, a sensing unit 130, a scan condition setting unit 140, and a position detecting unit 150.

The data receiving unit 110 receives information regarding space targeted for scanning. In the present specification, the space targeted for scanning may refer to space targeted for work, which is a space that the movable marking apparatus 10 works on, and the information received by the data receiving unit 110 may include a drawing corresponding to the space targeted for work, information regarding positions and sizes of a wall, a pillar, a window, etc. in the space targeted for work, that is, information regarding architectural and spatial elements of the space targeted for work. In addition, the data receiving unit 110 may receive information regarding a task that the movable marking apparatus 10 has to perform in the space targeted for work.

The information regarding the space targeted for scanning may include information regarding an allowable movement range of the movable marking apparatus 10. For example, the space targeted for scanning may include space where a wall, a pillar, a window, etc. have to be installed, and there may be space where the movable marking apparatus 10 has to be prevented from entering until they are installed. In space where a wall has to be built or an elevator has to be installed, a floor surface may be discontinuous, and in some cases, the movable marking apparatus 10 may be in danger of falling.

Accordingly, the information regarding the space targeted for scanning may include information regarding the allowable movement range, and thus, a moving range of the movable marking apparatus 10 may be limited.

The data receiving unit 110 may be connected to the sensing unit 130 in a wired or wireless manner and thus may receive data obtained from the sensing unit 130. Selectively, the data receiving unit 110 may include a terminal to which an external storage medium such as a universal serial bus (USB) port, a compact disc read-only memory (CD-ROM), etc. may be connected and thus may receive data regarding the space targeted for scanning stored in the external storage medium. Selectively, the data receiving unit 110 may be electrically connected to a separate input unit (not shown) and thus may receive data regarding the space targeted for scanning input from the input unit. Selectively, the data receiving unit 110 may be electrically connected to a separate computing apparatus and thus may receive data regarding the space targeted for scanning from the computing apparatus.

The driving unit 120 provides power to the movable marking apparatus 10. The driving unit 120 may be in any form of assigning mobility by providing power to the movable marking apparatus 10, and for example, the driving unit 120 may include a wheel or a caterpillar or may include a wing or a propeller. In addition, the driving unit 120 may include a structure imitating a leg of a human being or an animal, and may include a structure capable of moving and performing work even under water.

The sensing unit 130 scans the space targeted for scanning. The sensing unit 130 may include, but is not limited to, a scanning sensor and a driver such as a motor for controlling a rotating operation of the scanning sensor, and when a sensing range of the sensor is 360 degrees, the sensing unit 130 may not include a driver. In the present specification, terms such as "scan" and/or "scanning" may be used to describe all cases of sensing a target space and/or object by using a sensor and are not restrictively interpreted by a dictionary definition. The movable marking apparatus 10 may include the data receiving unit 110, the driving unit 120, and the sensing unit 130, and the scan condition setting unit 140 and the position detecting unit 150 may be spaced from the movable marking apparatus 10 independently of the movable marking apparatus 10.

Although FIG. 1 illustrates the scan condition setting unit 140 and the position detecting unit 150 included in a separate computing apparatus 11, this is merely an embodiment, and the disclosure is not limited thereto. Accordingly, the computing apparatus 11 may be coupled to the movable marking apparatus 10, and the scan condition setting unit 140 and the position detecting unit 150 may serve as components of the movable marking apparatus 10.

Meanwhile, the scanning sensor is a sensor for measuring a distance to an object, sensing a form of an object, or sensing movement of the movable marking apparatus 10, and may include a sensor using laser or using sound waves, light waves and/or radio waves, an inertial measurement unit (IMU) sensor, a global positioning system (GPS) sensor and/or may include an image acquiring sensor, such as a camera, capable of acquiring a moving image and/or a still image. When the scanning sensor includes a laser sensor, a LiDAR sensor may be included as an example of the laser sensor. The sensing unit 130 may include at least one sensor described above, and sensing precision may be improved by combining different types of sensors. For example, movement of the movable marking apparatus 10 may be sensed by using a LiDAR sensor as a laser sensor and further including an IMU sensor, and thus, sensing precision with respect to space targeted for scanning may improve. In addition, a camera sensor may be selectively and/or additionally included to allow the camera sensor to capture an image of space targeted for scanning. For example, an image of a state and/or texture of a certain surface, more particularly, a floor surface of space targeted for scanning may be captured, and thus, a movement and/or work path of the movable marking apparatus 10 may be set and/or corrected. In addition, a distance measurement sensor may be selectively and/or additionally included, and thus, a distance to a certain point, for example, a wall or a pillar, may be measured. Accordingly, a measured position of the certain point in the space targeted for scanning may be reflected to set and/or correct a movement and/or work path of the movable marking apparatus 10. Such configurations of the sensing unit 130 may be applied to all embodiments of the present specification.

The movable marking apparatus 10 may scan surrounding space by using the scanning sensor, and may obtain a position of an object in the surrounding space in the form of polar coordinates by using information where a scan signal output by the scanning sensor is reflected. The motor allows the scanning sensor to rotate by as much as a desired angle, for example, 360°. A rotating direction of the scanning sensor may be variously controlled as necessary.

Meanwhile, horizontal rotation, horizontal movement, tilt and/or vertical movement of the scanning sensor may be controlled by a separate driver. Horizontal rotation, horizontal movement, tilt and/or vertical movement of the scanning sensor may be controlled independently of one another, and control signals for controlling the horizontal rotation, horizontal movement, tilt and/or vertical movement may also be independently generated and be provided to the driver.

The scan condition setting unit 140 may set a movement path of the movable marking apparatus 10, may set a scan position in the space targeted for scanning by taking into account reference map data corresponding to the space targeted for scanning, and may set a scan angle of the sensing unit 130 at the scan position. The scan angle may include a scanning direction of the sensing unit 130. In this regard, the scan condition setting unit 140 may set a scan position and/or a scan angle by taking into account characteristics of an object in the space targeted for scanning obtained from reference map data.

The scan condition setting unit 140 sets the movement path, and designates an arbitrary point on the movement path to set the designated point as a scan position. According to the space targeted for scanning, if necessary, a plurality of positions may be set as the scan position. In response, when the movable marking apparatus 10 arrives at the scan position, the scanning sensor performs a scanning operation. In this regard, the scanning sensor rotates according to a scan angle set by the scan condition setting unit 140.

Meanwhile, a scan height of the scanning sensor may be adjusted, and the scan condition setting unit 140 may set a scan angle and a scan height of the scanning sensor together at a set scan position. The scan position and the scan angle may be set by taking into account characteristics of the space targeted for scanning, for example, characteristics of an object in the space targeted for scanning.

The scan position and the scan angle are set by taking the reference map data into account, and for example, a position and an angle where a pillar, a window, an obstacle, etc. in the space targeted for scanning may be avoided may be set as the scan position and the scan angle.

In a case where it is difficult to obtain scan data, for example, in a case of transmitting light without reflection, the scan position and the scan angle may be arranged in empty space of the space targeted for scanning so that a position and an angle where a pillar, an obstacle, or the like may be scanned may be set as the scan position and the scan angle.

When there is a drawing of the space targeted for scanning, the scan condition setting unit 140 may set the movement path, the scan position and/or the scan angle of the scanning sensor at the scan position by taking the drawing into account.

The movable marking apparatus 10 may be understood as performing a scanning operation at a certain position on the movement path. The certain scan position is designated to accurately identify a position of the movable marking apparatus 10.

Although a finite number of positions may be set as the certain position, the disclosure is not limited thereto, and a scanning operation may be continuously performed while moving on the movement path.

Meanwhile, the scan angle refers to a scanning angle of the scanning sensor at each scan position and may be represented as degrees or radians. A size of the scan angle may be represented based on an x-axis or may be represented based on an angle of the scanning sensor corresponding to a time when a scanning operation at the very previous scan position is finished.

In an embodiment of the disclosure, the movable marking apparatus 10 may stop at each scan position, and while stopping at the scan position, may allow the scanning sensor to rotate and scan surrounding space. Alternatively, in another embodiment of the disclosure, the movable marking apparatus 10 may not stop at the scan position, and while moving, may scan surrounding space via the scanning sensor. The position detecting unit 150 detects a position of the movable marking apparatus 10 by comparing scan data obtained via the sensing unit 130 at the plurality of scan positions with the reference map data.

The reference map data may be represented as coordinates of a pixel included in an image frame, and coordinates of a pixel corresponding to a position of an object may have different values from coordinates of a pixel corresponding to an empty position. As described above, data obtained via the scanning sensor may be obtained in the form of polar coordinates, and when the reference map data is compared with the scan data, a position of the movable marking apparatus 10 in the space targeted for scanning may be determined.

In detail, the position detecting unit 150 may convert the reference map data into data in the form of polar coordinates obtained via the scanning sensor and may compare the converted data with the scan data.

In another embodiment of the disclosure, the position detecting unit 150 may receive a position signal output from a transceiver (not shown) installed at an arbitrary position and may determine a position of the movable marking apparatus 10 from the position signal. When a position of the transceiver is determined, the transceiver may determine a position of the movable marking apparatus 10 based on the position of the transceiver and may provide determined position information to the position detecting unit 150. The transceiver may be installed indoors and may communicate with the movable marking apparatus 10, thereby helping determination of a position of the movable marking apparatus 10. As another example, the transceiver may be installed, for example, at four corners of a building and may recognize a coordinate value of the building by receiving a GPS signal and then transmit a new signal based on the value, thereby helping determination of a position of the movable marking apparatus 10. Alternatively, the position detecting unit 150 may determine a position of the movable marking apparatus 10 by taking into account a distance from the movable marking apparatus 10 to the transceiver, angle data, and position information of the transceiver. Selectively, the position detecting unit 150 may sense a position of a marker (not shown) installed at an arbitrary position and may determine a position of the movable marking apparatus 10 from the marker. For example, the position detecting unit 150 may determine a position of the movable marking apparatus 10 inversely from a position where a position of the marker is sensed and/or analysis of sensed data.

An operation performed by the position detecting unit 150 intends to determine a position of the movable marking apparatus 10 as accurately as possible, and the transceiver and/or the marker may be attached on an arbitrary position, for example, a pillar or a wall of the space targeted for scanning, to transmit the position signal and/or mark a position.

However, a location of the transceiver and/or the marker is not limited to an arbitrary position inside the space targeted for scanning. For example, when the space targeted for scanning is open space, a position of the movable marking apparatus 10 may be traced even if the transceiver and/or the marker is outside the space targeted for scanning.

The movable marking apparatus 10 may include a receiver (not shown) capable of receiving the position signal and determining a position of the transceiver transmitting the received position signal and a distance and/or an angle with respect to the transceiver, and the receiver may determine a position of the movable marking apparatus 10 by taking into account a position signal received from at least one transceiver.

The transceiver may be configured through a signal sharer or a beacon and may be used when an accurate position of the movable marking apparatus 10 is difficult to determine through comparison between the scan data and the reference map data.

The marker may mark a certain color or shape or a predetermined number, and a receiver of the movable marking apparatus 10 may determine a position of the movable marking apparatus 10 by recognizing the color, the shape, or the number. The marker may be displayed so as to be identifiable through a special apparatus such as an ultraviolet camera.

Figure 2:
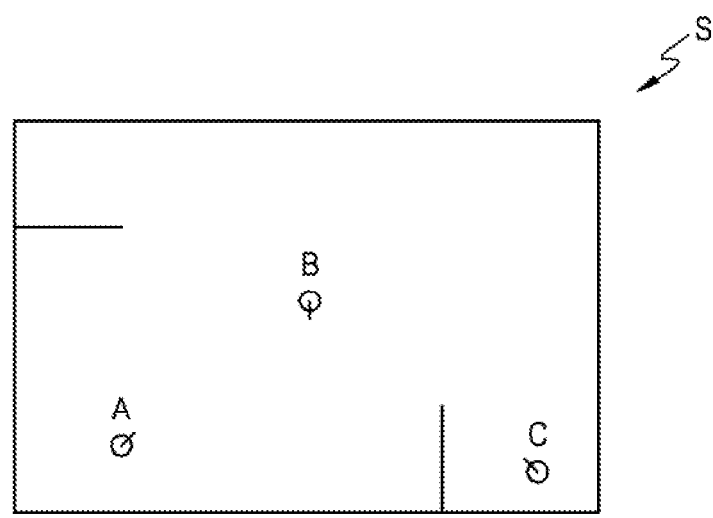
FIG. 2 illustrates an example of a process of setting a scan position and a scan angle.

FIG. 2 is a diagram illustrating an example of a process of setting a scan position and a scan angle.

The scan condition setting unit 140 may set a scan angle at each scan position by taking into account an amount of the scan data obtained according to a scan angle of the scanning sensor on a movement path of the movable marking apparatus 10 in space S targeted for scanning. As an amount of the scan data obtained increases, accurate information regarding the space S targeted for scanning may be obtained. This may be understood as setting a scan position and/or a scan angle by taking into account characteristics of an object in space targeted for scanning obtained from reference map data corresponding to the space targeted for scanning.

When the scan position and the scan angle change within the space targeted for scanning, an amount of the scan data obtained via the scanning sensor may change. For example, referring to FIG. 2, position A, position B, and position C are examples of a scan position on a movement path of the movable marking apparatus 10, and at position A, it may be expected to obtain the largest amount of scan data when a scan angle of the scanning sensor is set in a northeast direction. It may be understood that this is because of limiting a sensing range of the scanning sensor to a certain angle, and in an embodiment, the sensing range of the scanning sensor may be 180°. However, the sensing range of the scanning sensor is not limited to 180°.

At position B, it may be determined that a relatively similar amount of scan data may be obtained even though the scan angle is set in any direction, and at position C, it may be expected to obtain the largest amount of scan data when the scan angle is set in a northwest direction.

The scan condition setting unit 140 may set a scan angle at which the scan data is expected to be obtained most, and as described above, the scan angle may be set differently at each scan position.

The scan condition setting unit 140 may use the reference map data to set the scan angle and the scan position, and to set a scan angle at each scan position, may simulate an amount of the scan data obtained with respect to various sensing angles by taking into account a sensing range of the scanning sensor at the scan position.

The scan condition setting unit 140 may take a speed of the movable marking apparatus 10 into account to determine the scan position. The scanning sensor continuously performing a scanning operation may obtain more accurate scan data at a section where the movable marking apparatus 10 moves slowly. On the other hand, accuracy of scan data obtained at a section where the movable marking apparatus 10 moves quickly may be relatively low.

Although simulation of an amount of the scan data obtained may be performed at every position on the movement path of the movable marking apparatus 10, work speed may decrease when a computational amount increases, and thus, some positions may be set as the scan position.

Accordingly, the scan condition setting unit 140 may set a scan angle of the scanning sensor corresponding to a point where a speed of the movable marking apparatus 10 is equal to or greater than a predetermined value.

A moving speed of the movable marking apparatus 10 at a straight section may be greater than that at a curved section. Since the moving speed of the movable marking apparatus 10 may be predetermined in response to a movement path of the movable marking apparatus 10, the scan condition setting unit 140 may set the scan position by taking the movement path into account.

In FIG. 2, when a speed of the movable marking apparatus 10 at positions A, B, and C is equal to or greater than a predetermined value, positions A, B, and C may be set as scan positions. In addition, when a scan angle at position A is 45° (northeast direction), and a scan angle at position B is 270° (south direction), the movable marking apparatus 10 may move from position A to position B along a determined movement path, and in response, a scan angle of the scanning sensor may continuously change from 45° to 270°. In this regard, a change direction of the scan angle, that is, a rotation direction of the scanning sensor, is not limited to any one of a clockwise direction and a counterclockwise direction and may be determined as a direction where the largest amount of scan data may be obtained by taking into account a distance between position A and position B and a movement speed of the movable marking apparatus 10.

Figure 3:
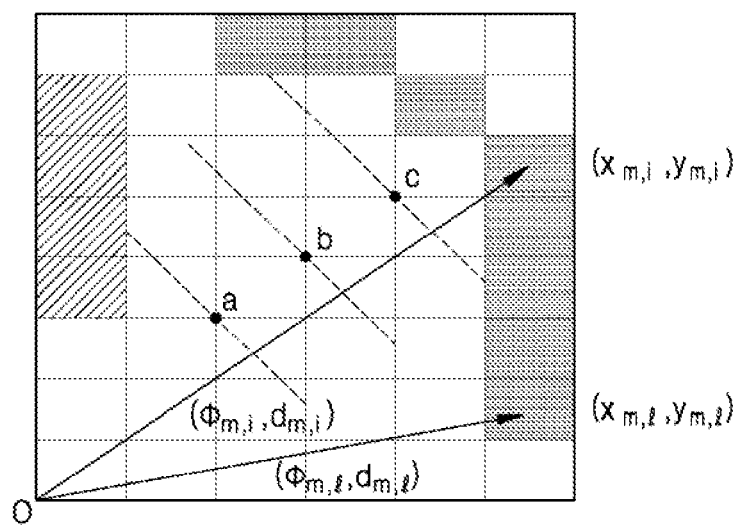
FIG. 3 illustrates an example of a data conversion process in which reference map data is compared with scan data to determine a position of a movable marking apparatus.

FIG. 3 is a drawing illustrating an example of a data conversion process in which reference map data is compared with scan data to determine a position of a movable marking apparatus.

Referring to FIG. 3, the reference map data may be represented in a grid format, and portions darker than other gird areas denote presence of an object reflecting a scan signal of a laser sensor. Each grid area may be represented as coordinates such as $(x_{m,i}, y_{m,i})$ and $(x_{m,l}, y_{m,l})$.

The position detecting unit 150 according to an embodiment, which is described above with reference to FIG. 1, performs an operation of comparing the reference map data with scan data to determine a position of the movable marking apparatus 10, and unlike the reference map data including grid data, the scan data includes data regarding a distance and an angle with respect to an object. Accordingly, the position detecting unit 150 may convert the reference map data in a grid format into data regarding a distance and an angle to compare the reference map data with the scan data.

Referring to FIG. 3, a position represented as coordinates of $(x_{m,i}, y_{m,i})$ and $(x_{m,l}, y_{m,l})$ in the reference map data may be converted into polar coordinate data of $(\Phi_{m,i}, d_{m,i})$ and $(\Phi_{m,l}, d_{m,l})$, respectively, and the polar coordinate data matches a data format of the scan data. Accordingly, the position detecting unit 150 may directly compare the converted reference map data with the scan data and may determine a position of the movable marking apparatus 10 by using a result of the comparison.

However, the reference map data and the scan data are not limited to a grid format and a polar coordinate format, respectively, and the disclosure is not limited to converting data in the grid format into the polar coordinate format to compare two types of data. Accordingly, the reference map data and the scan data may be represented as data of other types instead of the grid format and the polar coordinate format, and it is also possible to compare two types of data by converting the scan data so as to correspond to a format of the reference map data.

In FIG. 3, although a plurality of grid areas may be understood as corresponding to respective pixels when represented through a display apparatus, the disclosure is not limited thereto, and one grid area may correspond to a plurality of pixel groups. A reference point for polar coordinate conversion is not limited to the origin (0) illustrated in FIG. 3.

When the sensing unit 130 obtains scan data regarding an object in the space targeted for scanning, the position detecting unit 150 may determine the presence of matching data by comparing distance/angle data corresponding to the scan data with the converted reference map data.

There may be various pieces of matching data depending on a result of the determination, and the position detecting unit 150 may improve accuracy of position determination regarding the movable marking apparatus 10 by comparing a plurality of pieces of scan data with the converted reference map data.

The position detecting unit 150 may determine the most reliable position as a position of the movable marking apparatus 10 by comparing each of the plurality of pieces of scan data with the reference map data.

For example, when first scan data to n-th scan data are obtained by using the scanning sensor at the same position, the position detecting unit 150 may search for reference map data corresponding to the first piece of scan data. As a search result, there may be m pieces of reference map data corresponding to the first scan data, and the position detecting unit 150 may compare the second scan data with the m pieces of reference map data. After such a process is repeatedly performed, a position where the first scan data to n-th scan data are obtained, that is, a position of the movable marking apparatus 10, may be ultimately detected.

To detect a position of the movable marking apparatus 10 by comparing reference map data with scan data, the position detecting unit 150 may use most recently obtained scan data.

In FIG. 3, positions a, b, and c are examples of some positions on a movement path of the movable marking apparatus 10, and description is given below assuming that the movable marking apparatus 10 moves from position a to position c and the scanning sensor faces a direction from position a toward position c.

The scanning sensor may obtain scan data by performing a scanning operation at positions a, b, and c, and when the scanning sensor may scan only a limited range, for example, when the scanning sensor may scan a total range of 180° with ±90° with respect to the front, referring to FIG. 3, data amounts of scan data obtained through the scanning sensor at respective positions a, b, and c may be different from one another.

For example, an amount of scan data obtained at position a may be greater than an amount of scan data obtained at position c. In this regard, to detect a position of the movable marking apparatus 10 by comparing reference map data with scan data when the movable marking apparatus 10 is at position c, the position detecting unit 150 may compare scan data obtained at position b with the reference map data.

Since an amount of scan data obtained at position a is more than that of scan data obtained at position b, computational speed may be increased by comparing the scan data obtained at position b with the reference map data.

Since the scanning sensor may obtain scan data by continuously performing scanning, and the position detecting unit 150 may continuously detect an accurate position of the movable marking apparatus 10 by using the scanning data, using data obtained at a time closest to a current time may be a way of improving accuracy of position detection.

Figure 4:
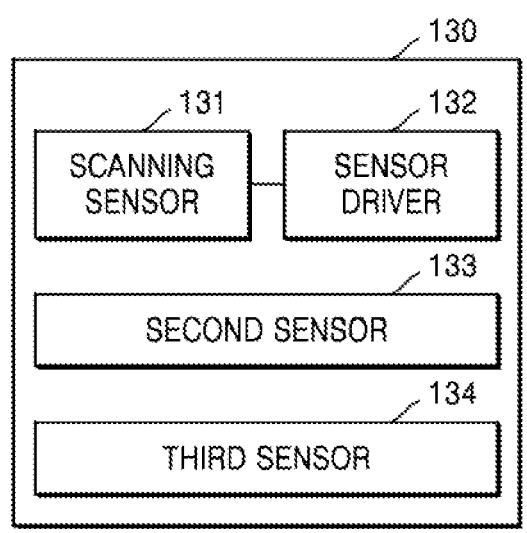
FIG. 4 schematically illustrates configurations of a sensing unit according to another embodiment of the disclosure.

FIG. 4 is a drawing schematically illustrating configurations of the sensing unit 130 according to another embodiment.

Referring to FIG. 4, the sensing unit 130 according to another embodiment may include a scanning sensor 131, a sensor driver 132, a second sensor 133, and a third sensor 134. As described above with reference to FIG. 1, the scanning sensor 131 is a sensor for measuring a distance to an object or scanning a form of the object, and may include a sensor using laser or using sound waves, light waves and/or radio waves, an IMU sensor, a GPS sensor and/or an image acquiring sensor, such as a camera, capable of acquiring a moving image and/or a still image. The sensor driver 132 may physically control an operation of the scanning sensor 131 and may control rotary driving, tilt driving, and/or up-and-down driving of the scanning sensor 131.

In an embodiment, the sensor driver 132 may include a horizontal rotation driver (not shown), a tilt driver (not shown), a horizontal driver (not shown) and/or a vertical driver (not shown) for controlling rotary driving, tilt driving, horizontal driving and/or vertical driving of the scanning sensor 131. The horizontal rotation driver may control a horizontal rotation operation of the scanning sensor 131, and the tilt driver may control an up-and-down scan angle of the scanning sensor 131. The horizontal driver may control the scanning sensor 131 to horizontally drive the scanning sensor 131. The vertical driver may control the scanning sensor 131 to adjust height thereof by vertically driving the scanning sensor 131.

The horizontal rotation driver, the tilt driver, the horizontal driver and/or the vertical driver may be driven independently of one another, and an operation of one driver does not limit or subordinate an operation of another driver. Accordingly, the horizontal rotation driver, the tilt driver, the horizontal driver and/or the vertical driver may respectively operate according to different control signals and may be understood as being also physically independently driven.

Up-and-down scanning may be performed on an object in the space targeted for scanning by controlling an up-and-down scan angle of the scanning sensor 131. Although the up-and-down scan operation may be performed by the tilt driver and/or the vertical driver, the disclosure is not limited thereto, and a plurality of scanning sensors may be arranged at different angles from each other with respect to a working surface to perform up-and-down scanning.

The second sensor 133 and the third sensor 134 may also be sensors for measuring a distance to an object or scanning a form of the object. According to an embodiment, as sensors for measuring data of a different type from the scanning sensor 131, the second sensor 133 and the third sensor 134 may measure data which is used with the scan data obtained by the scanning sensor 131 to determine a position of the movable marking apparatus 10.

In an embodiment, the second sensor 133 may include an IMU, and the third sensor 134 may include an encoder.

The IMU may measure acceleration and angular speed data of the movable marking apparatus 10, and the acceleration and angular speed data may be used to calculate a speed and an orientation angle of the movable marking apparatus 10. The encoder is a position sensor capable of measuring displacement of the movable marking apparatus 10 and may provide data regarding a movement distance of the movable marking apparatus 10.

Scan data obtained from the scanning sensor 131, angular speed and acceleration data obtained from the IMU, and displacement data obtained from the encoder may be provided to the position detecting unit 150, and the position detecting unit 150 may detect a position of the movable marking apparatus 10 by putting together the pieces of measured data.

Accordingly, even when accuracy of some pieces of measured data is low, a position of the movable marking apparatus 10 may be accurately detected.

In another embodiment of the disclosure, the sensing unit 130 may not include at least the horizontal rotation driver of the sensor driver 132. For example, as described above, when a scanning sensor capable of rotating 360 degrees is used, the scanning sensor 131 may rotate on its own, and thus, the sensor driver 132 for controlling a rotation operation of the scanning sensor 131 may not be required. However, even in this case, the tilt driver, the horizontal driver, and the vertical driver may be included.

FIG. 5 illustrates an example of a cycle of obtaining data through a scanning sensor, an IMU, and an encoder.

As described with reference to FIGS. 4 and 5, the sensing unit 130 may include the scanning sensor 131, the second sensor (for example, the IMU) 133, and the third sensor (for example, the encoder) 134, and the position detecting unit 150 may take into account together scan data obtained through the scanning sensor 131 and data regarding acceleration and angular speed obtained through the second sensor 133 to determine an accurate position of the movable marking apparatus 10, and may also take into account distance data of the movable marking apparatus 10 obtained through the third sensor 134.

In this regard, a reliability value may be assigned by taking into account measurement accuracy of the scanning sensor 131, the second sensor 133, and the third sensor 134, and scan data, IMU data (acceleration and angular speed data), and distance data having the reliability value reflected may be used.

Reliability regarding data obtained from the scanning sensor 131, the IMU 133, and the encoder 134 may be determined by taking into account an error rate showing up in its own specifications of each measurement apparatus. Accordingly, a higher reliability value may be assigned to data provided from a measurement apparatus providing more accurate data compared to other measurement apparatuses, and thus, a position of the movable marking apparatus 10 may be accurately detected.

The reliability value may vary according to time. For example, when the movable marking apparatus 10 is set to move at a speed of 1 m/s, a distance that the movable marking apparatus 10 moves during one second should be measured as 1 m. In addition, by taking into account distance data measured during the one second through the encoder 134 and an error rate according to specifications of the encoder 134, a reliability value regarding the distance data may be differently applied after the one second.

When an error rate of the encoder 134 is assumed to be ±1%, in the above example, the distance data may be expected to be within a range of 99 cm to 101 cm. Nevertheless, when the distance data is not within the range of 99 cm to 101 cm, a lower reliability value may be assigned to the distance data. On the other hand, as the distance data is close to 1 m, a high reliability value may be assigned to the distance data.

Accordingly, obtaining the distance data during each second may be understood as updating a reliability value regarding the distance data during each second.

When time cycles of obtaining the scan data, the IMU data, and the distance data are different from one another, a reliability value which is assigned to each data based on data having the longest data obtaining cycle may be reset to a first assigned reliability value.

Referring to FIG. 5, it may be found that an obtaining cycle of the distance data obtained through the encoder is shortest, and an obtaining cycle of the scan data obtained through the scanning sensor 131 is longest.

Accordingly, a reliability value regarding the distance data may be updated during the shortest cycle, and a reliability value regarding the scan data may be updated during the longest cycle. As described above with reference to FIG. 2, at a time when the scan data having the longest data obtaining cycle is obtained, a reliability value regarding all data may be reset to a first assigned reliability value.

That is, reliability values assigned for each data at a time $t_1$ and a time $t_5$ may be understood as identical.

FIG. 6 is a drawing illustrating an example of a process of performing marking work by comparing a prior map with scan data.

The prior map refers to a map including information regarding the space targeted for scanning and marking data corresponding to the space targeted for scanning, and in an embodiment, the prior map may be a CAD drawing. Selectively, the prior map may be understood as a reference map including the marking data, and the prior map may provide information regarding the space targeted for scanning even before scan data regarding the space targeted for scanning is obtained by the sensing unit 130.

FIG. 6A illustrates a prior map, and the prior map may include information and marking data regarding space targeted for scanning. Referring to FIG. 6A, the space targeted for scanning includes a first space S1 and a second space S2 divided by a wall, and the first space S1 includes circular marking data and the second space S2 includes triangular marking data.

Information regarding the space targeted for scanning obtained from the prior map may be different from reality. Accordingly, selectively, before performing marking work, a movable marking apparatus according to an embodiment may generate a reference map by using a scanning sensor at at least one point of the space targeted for scanning.

Although an operation of the scanning sensor for generating the reference map is not illustrated in FIG. 1, the scanning sensor may perform a scanning operation on the space targeted for scanning to obtain not only scan data for determining a position of the movable marking apparatus but also information regarding the space targeted for scanning and may obtain scan data therefrom.

FIG. 6B illustrates a reference map generated at position D of the first space S1, and space denoted by a solid line denotes space that may be obtained through a scanning sensor at position D and space denoted by a dash line denotes space that may not be obtained at position D. Accordingly, information regarding the space denoted by a dash line in FIG. 6B may be understood as being not included in scan data obtained at position D.

When the scan data obtained at position D is compared with the prior map, pieces of information regarding the second space S2 do not match, and accordingly, it may be found that obtaining scan data at a new position is required to obtain information regarding the second space S2. Selectively, the movable marking apparatus may mark a circle by performing marking work in the first space S1 and may move to position E and perform a scanning operation again.

The new scan data obtained at position E may include information regarding the second space S2, and the scan condition setting unit 140 may ultimately update the reference map by merging the new scan data obtained at position E with scan data corresponding to FIG. 6B.

In another embodiment of the disclosure, the reference map may be generated from sub scan data obtained through at least one sub scanning sensor (not shown) installed in space targeted for scanning. Depending on characteristics of the space targeted for scanning, a plurality of sub scanning sensors may be installed. For example, as illustrated in FIG. 6, when the entire space targeted for scanning includes the two separate spaces S1 and S2, two sub scanning sensors may be installed to obtain sub scan data regarding the first space S1 and the second space S2, respectively.

The sub scan data may be previously obtained even if a scanning operation by the sensing unit 130 is not performed, and the data receiving unit 110 may receive the sub scan data and generate the reference map. Accordingly, a process of generating a reference map through the sensing unit 130 at an arbitrary position before performing work in the space targeted for scanning may be omitted.

In addition, the scan condition setting unit 140 may set a scan position and a scan angle by taking into account a reference map generated from the sub scan data.

As illustrated in FIG. 6, even when it is difficult to obtain scan data regarding the entire space through one scanning operation, a reference map regarding the entire space may be easily generated.

FIG. 7 is a drawing schematically illustrating a method of determining a movement path and a marking path of the movable marking apparatus.

The figure illustrated in FIG. 7 is an example of marking data, and the movable marking apparatus described above with reference to the preceding drawings may move in space targeted for scanning and perform work corresponding to the marking data.

As described above with reference to FIG. 1, the scan condition setting unit 140 sets a movement path of the movable marking apparatus corresponding to the marking data, and in an embodiment, the scan condition setting unit 140 may set a marking path capable of minimizing a movement distance of the movable marking apparatus by taking the marking data into account.

The scan condition setting unit 140 may extract at least one figure, line, etc. from the marking data received via the data receiving unit 110, and by taking into account a connection relationship of the figure, line, etc., may designate a plurality of figures, lines, etc. connected to each other as one group.

In addition, the scan condition setting unit 140 may calculate a marking path capable of drawing fastest the figure, line, etc. designated as one group, and for example, may determine whether or not there is an Eulerian path to calculate the marking path.

Figure 7A:
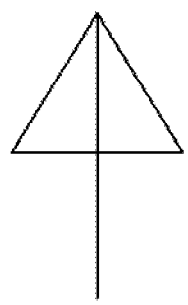
FIGS. 7A and 7B schematically illustrate a method of determining a moving path and a marking path of a movable marking apparatus.

Referring to FIG. 7A, there are a triangle and a line connected thereto on the left, and there are a circle and a square connected thereto on the right. Accordingly, the scan condition setting unit 140 may set the triangle and the line as one group (hereinafter referred to as a first group) and may set the circle and the square as another group (hereinafter referred to as a second group).

Figure 7B:
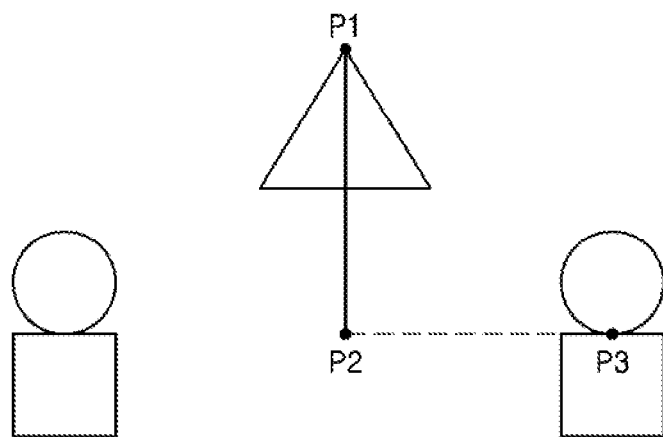

Next, the scan condition setting unit 140 may determine whether or not it is possible to draw in one stroke with respect to each group, and when it is possible to draw in one stroke, may calculate a marking path. All the figures illustrated in FIG. 7 are possible to draw in one stroke, and thus, as illustrated in FIG. 7B, the scan condition setting unit 140 may set a start point and an end point of the marking path with respect to each group.

For example, for the first group, it is possible to draw in one stroke when starting at point P1, and in this regard, an end point of the first group is point P2. For the second group, point P3 is a start point, and at the same time, an end point, and thus, a movement path of the movable marking apparatus may be set to move from point P2 to point P3 without marking work.

Although FIG. 7 illustrates marking data including a figure, a line, etc. possible to draw in one stroke, it is not possible to draw all marking data in one stroke, and thus, the scan condition setting unit 140 may split the marking data into a minimum unit possible to draw in one stroke.

In addition, a path capable of minimizing a movement distance of the movable marking apparatus may be set as a movement path between pieces of marking data that are not connected to each other.

FIG. 8 is a drawing illustrating an example of a method of correcting marking data.

Figure 8A:
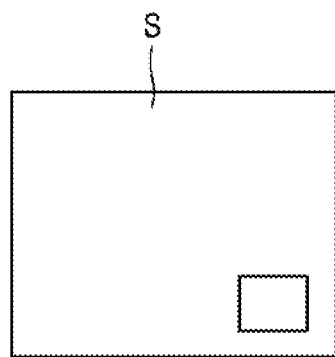
FIGS. 8A-8C illustrate an example of a correcting method of marking data.
Figure 8B:
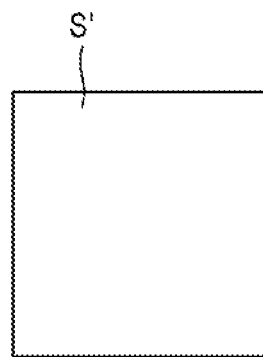

FIG. 8A illustrates the space S targeted for scanning, which includes marking data, and FIG. 8B illustrates space S' targeted for scanning, which is corrected with scan data obtained through a scanning sensor. That is, the space S targeted for scanning illustrated in FIG. 8A may be understood as a prior map (for example, a CAD drawing) including information regarding the space S targeted for scanning.

Referring to FIGS. 8A and 8B, the space S' targeted for scanning, which corresponds to scan data obtained through the scanning sensor, may have a difference from the space S targeted for scanning, which corresponds to the prior map. The prior map includes information regarding the space targeted for scanning but may include information different from an actual work environment, and in this case, the prior map may be corrected/updated by using scan data obtained through the scanning sensor.

The prior map may include marking data, and referring to FIG. 8A, it may be found that rectangular marking data is at the bottom right of the space S targeted for scanning. In this regard, the scan condition setting unit 140 may correct the marking data by reflecting correction/update information regarding the space S targeted for scanning.

Figure 8C:
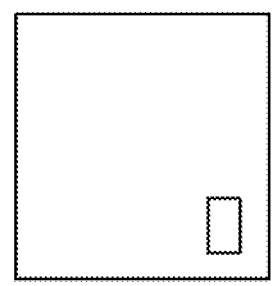

FIG. 8C illustrates marking data corrected according to scan data, and it may be found that a size of the marking data has been corrected in proportion to a size difference between the space S targeted for scanning of the prior map and the space S' targeted for scanning corresponding to the scan data.

In addition, the scan condition setting unit 140 may correct a position of the marking data in response to correction of space targeted for scanning. For example, when a horizontal length of the space targeted for scanning decreases, correction may be made to decrease a gap between the marking data and a vertical wall.

In another embodiment, even though a size of the space targeted for scanning changes, prior to correction of the marking data, the scan condition setting unit 140 may inform a worker that a size of the space targeted for scanning has been measured differently and may allow the worker to select whether to correct a size and a position of the marking data.

Figure 9:
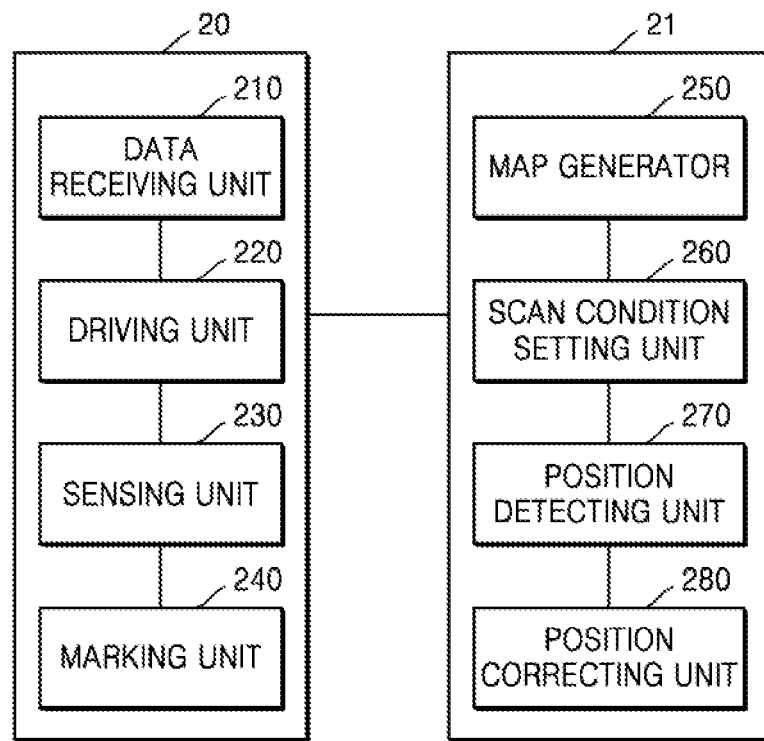
FIG. 9 schematically illustrates configurations of a movable marking system according to another embodiment of the disclosure.

FIG. 9 is a drawing schematically illustrating configurations of a movable marking system 200 according to another embodiment.

Referring to FIG. 9, the movable marking system 200 according to another embodiment may include a data receiving unit 210, a driving unit 220, a sensing unit 230, a marking unit 240, a map generating unit 250, a scan condition setting unit 260, a position detecting unit 270, and a position correcting unit 280.

Although FIG. 9 illustrates the movable marking system 200 corresponding to the movable marking system 100 of FIG. 1 further including the marking unit 240, the map generating unit 250, and the position correcting unit 280, the movable marking system 200 illustrated in FIG. 9 may further include only one of the marking unit 240, the map generating unit 250, and the position correcting unit 280.

The marking unit 240 performs a marking operation on a working surface in response to marking data. The working surface refers to a surface targeted for marking existing in space targeted for scanning, and the working surface may be included in the space targeted for scanning. In addition, a movable marking apparatus 20 may move on the working surface.

The marking unit 240 is provided to mark the content corresponding to the marking data on the working surface, and any tool capable of marking, such as ink, a photosensitizer, light, or sound waves, may be used. In addition, marking may also be performed by applying physical pressure to the working surface.

The marking data may include design data and text data, and the design data and the text data are distinguished from each other. For example, the design data may include information regarding a figure, etc. described above with reference to FIGS. 6 to 8, and the text data may be understood as corresponding to explanation, annotation, etc. that may be provided to a worker with regard to the design data.

The marking unit 240 may mark at least one of one-dimensional data and two-dimensional data on the working surface and may mark three-dimensional data on the space targeted for scanning including the working surface. For example, the marking unit 240 may mark three-dimensional data in a stacked form by performing marking on the marked working surface as many times as necessary.

The map generating unit 250 may generate a reference map corresponding to the space targeted for scanning, and in detail, the map generating unit 250 may generate the reference map from scan data obtained through a scanning sensor included in the sensing unit 230 at a reference position.

The reference position may be an arbitrary position in the space targeted for scanning, and in general, a center point of the space targeted for scanning may be selected as the reference position. A position close to a window or a position where there is an adjacent obstacle may not be suitable for the reference position. However, in some cases, the reference position may be an arbitrary position outside the space targeted for scanning.

At a window, a scan signal output from the scanning sensor may not be properly reflected, and thus, there may be a problem with obtaining the scan data. When there is an obstacle nearby, it may be difficult to obtain scan data of space behind the obstacle.

In addition, in a space where there is no object reflecting a scan signal output from the scanning sensor, it may be difficult to obtain scan data, and thus, the reference position may be arranged in an empty space within the space targeted for scanning to set a position where a pillar, an obstacle, or the like may be scanned as the reference position.

When it is difficult to obtain complete scan data due to an obstacle or a pillar, complete scan data may be obtained by performing first scanning at the reference position and then performing second scanning by designating an arbitrary position behind the obstacle or the pillar.

In a state where the movable marking apparatus 20 stops at the reference position, the scanning sensor scans the space targeted for scanning by rotating 360 degrees and thus generates the scan data. If necessary, a scan angle of the scanning sensor included in the sensing unit 230 may be controlled in a height direction through tilt control, etc. However, during a process of generating the scan data for generating the reference map, a position of the movable marking apparatus does not necessarily need to be fixed to the reference position, and it is also possible to generate the scan data by rotating the scanning sensor while the movable marking apparatus moves within a predetermined reference space.

The map generating unit 250 may generate a reference map of the space targeted for scanning from the scan data and may generate the reference map by applying a SLAM algorithm to the scan data obtained at the reference position. The SLAM is an abbreviation of simultaneous localization and mapping and is also called concurrent mapping and localization (CML). The SLAM refers to an algorithm in which, when a map is not given, and a position of a sensor at a map is unable to be determined, a map is generated while a surrounding environment is sensed via the sensor, and a position of the sensor is also estimated at the map.

The reference map may include image data of pixels included in an image frame corresponding to the scan data. For example, when the space targeted for scanning is represented as one frame, a pixel corresponding to a position of an object may be displayed in black, and a pixel corresponding to an empty space may be displayed as white.

However, this is merely an embodiment of a data format that the reference map data may include, the disclosure is not limited to including color information regarding an individual pixel, and the reference map data may be represented in a format such as a vector, a polar coordinate, etc.

In another embodiment of the disclosure, the map generating unit 250 may receive a drawing corresponding to the space targeted for scanning and generate the reference map. The drawing may be understood as including information regarding the space targeted for scanning, and in an embodiment, the drawing may be a CAD drawing. Accordingly, according to an embodiment, the drawing may play the same role as the reference map.

However, even though there is a drawing corresponding to the space targeted for scanning, the information regarding the space targeted for scanning shown in the drawing may not be accurate, and thus, the map generating unit 250 may newly generate the reference map. In this regard, the drawing and the reference map generated in the map generating unit 250 may be used together and/or selectively.

When pieces of information regarding the space targeted for scanning included in the drawing and the reference map do not match, the drawing and the reference map may each be weighted, and information regarding space targeted for scanning available in the scan condition setting unit 260 may be provided.

In another embodiment, the map generating unit 250 may compare a prior map including information regarding the space targeted for scanning with scan data obtained through the scanning sensor to correct the prior map. In addition, the scan condition setting unit 260 may use the corrected prior map as the reference map.

For example, the prior map may be a drawing corresponding to the space targeted for scanning as described above, and may include marking data within the space targeted for scanning.

Information represented through the prior map may not match characteristics of the space targeted for scanning, and in this case, the scan data obtained through the scanning sensor may provide more accurate information regarding the space targeted for scanning.

However, when a result of comparing the prior map with the scan data is beyond a preset error range, the map generating unit 250 may output an alarm. The alarm may be understood as a type of error reporting. On the other hand, when the result of comparing the prior map with the scan data is within the error range, the prior map may be corrected based on the scan data.

The scan condition setting unit 260 may use a prior map corrected in the map generating unit 250 as a reference map, and may set a scan condition regarding the movable marking apparatus 20 by taking into account data included in the reference map.

While the position detecting unit 270 converts data and compares the converted data with the scan data, an error may occur. For example, a position of the movable marking apparatus 20 determined in the position detecting unit 270 may momentarily dramatically change, or a position of the movable marking apparatus 20 may discontinuously change.

To address such a problem, the position correcting unit 280 may correct a position of the movable marking apparatus 20 by comparing a position of the movable marking apparatus 20 detected in the position detecting unit 270 with a movement path set in the scan condition setting unit 260.

In an embodiment, the position correcting unit 280 may correct a position of the movable marking apparatus 20 by using an IMU (an inertia sensor) included in the sensing unit 230. The IMU may provide acceleration sensing data and geomagnetic field sensing data, and the position detecting unit 270 may correct an error occurring during a process of comparing the reference map data with the scan data by using the acceleration sensing data and the geomagnetic field sensing data.

An apparatus for correcting the reference map data and the scan data is not limited to the IMU, and any sensor and/or measuring instrument capable of correcting a position of the movable marking apparatus may be used.

The scan condition setting unit 260 may set a movement path of the movable marking apparatus 20 in response to the marking data, may set a scan position within the space targeted for scanning by taking into account reference map data corresponding to the space targeted for scanning, and may set a scan angle of the sensing unit corresponding to the scan position. For example, the scan condition setting unit 260 may set the scan position and/or the scan angle by taking into account characteristics of an object in space targeted for scanning obtained from reference map data corresponding to the space targeted for scanning.

The movement path may include a pattern or a line according to the marking data. In an embodiment, the movable marking apparatus 20 may be used to make a particular mark on a position desired by a worker within particular space, and the movable marking apparatus 20 may move along the movement path and make a mark or draw a line on the working surface by using the marking unit 240 at a position included in the marking data.

In another embodiment of the disclosure, the sensing unit 230 may further include an imaging unit (not shown) and/or an image signal generator (not shown). The imaging unit may include a camera unit such as a charge-coupled device (CCD) camera and may capture an image of the working surface by using the camera unit.

The image signal generator is electrically connected to the imaging unit and generates an image signal based on the image captured in the imaging unit. The position detecting unit 270 may calculate and/or check a position of the movable marking apparatus 20 on the marking data based on the image signal.

The imaging unit may capture an image of a result of work performed in response to the marking data, and the image signal is data corresponding to the data and may be compared with the marking data. Accordingly, the position detecting unit 270 may determine a position of the movable marking apparatus 20 by comparing the image signal with the marking data and may determine whether or not the marking unit 240 performs work desired by a worker in response to the marking data. In addition, the position detecting unit 270 may provide a result obtained through the imaging unit to the worker and may provide current work status through the image signal or in another format of data.

That is, a work result corresponding to the marking data may be provided to the worker in a format of an image signal obtained through the imaging unit or may be provided to the worker in a format of data obtained through a sensor capable of recognizing the work result (for example, position data corresponding to the work data, data including a result of comparing the work result with the marking data, etc.).

Through the above configuration, even when the worker is located in space separate from the movable marking apparatus 20, the worker may check a marking operation performed through the movable marking apparatus 20 in real time.

In addition, the position detecting unit 270 may take into account relative positions of the movable marking apparatus 20 and the marking unit 240. For example, positions of the movable marking apparatus 20 and the marking unit 240 may be respectively defined as a first position and a second position, and in an idle state in which the movable marking apparatus 20 does not operate, the first position and the second position may be defined as matching.

The marking unit 240 may move independently from the movable marking apparatus 20, and when the movable marking apparatus 20 operates, the second position and the first position may not match.

The marking unit 240 may move independently from the movable marking apparatus 20, and may freely move in various directions including up and down and left and right. Accordingly, through an operation in which a mark is made on a current position as the marking unit 240 vertically descends in a state in which the movable marking apparatus 20 does not move, the current position may be set as a reference point.

Alternatively, when the movable marking apparatus 20 moves in a state in which the marking unit 240 is fixed, a position of the marking unit 240 may subordinately change in response to a position of the movable marking apparatus 20, and in this regard, the movable marking apparatus 20 may move along a movement path corresponding to the marking data.

Alternatively, the marking unit 240 may move independently from a movement direction of the movable marking apparatus 20. As an example, the movable marking apparatus 20 may move along a predetermined movement path, and at the same time, the marking unit 240 may perform marking work corresponding to the marking data independent from the movement path. In another embodiment, the marking unit 240 may perform marking work in response to the marking data in a state in which the movable marking apparatus 20 does not move.

A sub sensor (not shown) for determining a position of the marking unit 240 operating independently of the movable marking apparatus 20 may be included. The sub sensor may be included in the sensing unit 230, and the position detecting unit 270 may determine a position of the marking unit 240 (the second position) by using data measured through the sub sensor and thus may calculate a distance between the movable marking apparatus 20 and the marking unit 240.

According to another embodiment of the disclosure, as described above, the movable marking apparatus 20 and the marking unit 240 may move independently of each other and thus may operate properly in response to a work situation.

The position detecting unit 270 may calculate the first position, which is a position of the movable marking apparatus 20, by using the second position and a distance between the movable marking apparatus 20 and the marking unit 240, or correspondingly, may calculate the second position, which is a position of the marking unit 240, by using the first position and a distance between the movable marking apparatus 20 and the marking unit 240.

Since the second position refers to a position of the marking unit 240, the position detecting unit 270 may determine the second position by comparing the marking data with the image signal reflecting a result of work performed by the marking unit 240.

Accordingly, even though a position of the movable marking apparatus 20 determined through a result of comparing the map data with the scan data is not accurate, accuracy of position determination of the movable marking apparatus 20 may be improved by using the second position.

In addition, the position detecting unit 270 may include an alarm module (not shown) for outputting an alarm when a position of the movable marking apparatus 20 and the movement path turn out to be a mismatch as a result of comparison. Through the alarm, a worker may recognize that the position of the movable marking apparatus 20 is off a preplanned position, and may control a subsequent operation of the movable marking apparatus 20.

When a position of the movable marking apparatus 20 determined by using the IMU or a position of the marking unit 240 (the second position) is off the movement path by a predetermined range or more, the position correcting unit 280 may correct the position of the movable marking apparatus 20 so as to correspond to the movement path. In this regard, the position correcting unit 280 may control the position of the movable marking apparatus 20 by controlling the driving unit 220.

That is, the position correcting unit 280 may determine whether to correct a position of the movable marking apparatus 20 according to a degree of mismatch between the position of the movable marking apparatus 20 and the movement path. In addition, whether to correct a position of the movable marking apparatus 20 may be determined by a worker checking the alarm.

As described above with reference to FIG. 4, the sensing unit 230 may further include an encoder, and the position correcting unit 280 may correct a position of the movable marking apparatus 20 by using displacement data of the movable marking apparatus 20 provided from the encoder.

In an embodiment, an image of a work result regarding the working surface may be obtained by using the imaging unit (not shown) and the image signal generator (not shown) and may be compared with the marking data input to the data receiving unit 210. Alternatively, instead of obtaining the work result as an image, the work result may be obtained in another form by using a photosensitizer, light waves, etc.

When the work result turns out to have an error as a result of comparing the work result with the marking data, the marking unit 240 may perform marking work again by deleting a wrongly marked portion at a point where the corresponding error occurs or by painting over the wrongly marked portion.

Alternatively, a result of comparing the work result with the marking data may be provided to a user, and thus, the user may be allowed to determine whether to perform marking work again.

In another embodiment of the disclosure, the scan condition setting unit 260 may allow the sensing unit 230 to perform second scanning on the space targeted for scanning before the movable marking apparatus 20 starts marking work.

For example, when the reference map is generated by using the scanning sensor, a worker of the space targeted for scanning may be recognized as an object, and while the movable marking apparatus 20 performs work, the worker may not be in the space targeted for scanning.

In this regard, the reference map may be updated by using scan data obtained through the second scanning, and thus, marking work may be performed after unnecessary data is removed.

Alternatively, an imaging apparatus may be provided in the sensing unit 230 and may be set to suspend, when a moving object is detected during a scanning operation for generating reference map data, a scanning operation and resume the scanning operation after a certain time.

Figure 10:
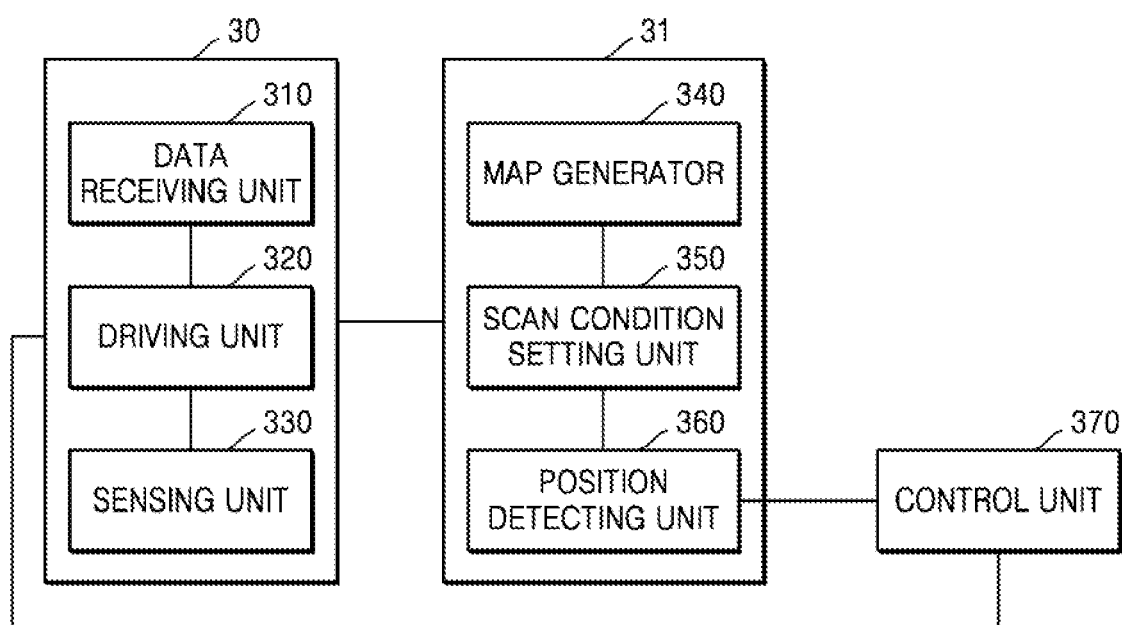
FIG. 10 schematically illustrates configurations of a movable marking system according to another embodiment of the disclosure.

FIG. 10 is a drawing schematically illustrating configurations of a movable marking system 300 according to another embodiment.

Referring to FIG. 10, the movable marking system 300 includes a movable marking apparatus 30 and a computing apparatus 31, and the movable marking apparatus 30 may include a data receiving unit 310, a driving unit 320, and a sensing unit 330. The computing apparatus 31 may include a map generating unit 340, a scan condition setting unit 350, and a position detecting unit 360, and the movable marking apparatus 30 may further include a control unit 370.

The data receiving unit 310, the driving unit 320, the sensing unit 330, the map generating unit 340, the scan condition setting unit 350, and the position detecting unit 360 perform substantially the same functions as the data receiving unit 210, the driving unit 220, the sensing unit 230, the map generating unit 250, the scan condition setting unit 260, and the position detecting unit 270 described above with reference to FIG. 9, and thus, a repeated description thereof is omitted below.

Although the map generating unit 340, the scan condition setting unit 350, and the position detecting unit 360 are illustrated as being included in the separate computing apparatus 31, this is merely an embodiment, and the disclosure is not limited thereto. Accordingly, as described above with reference to FIG. 1, the computing apparatus 31 may be coupled to the movable marking apparatus 30, and in this regard, the map generating unit 340, the scan condition setting unit 350, and the position detecting unit 360 may serve as components of the movable marking apparatus 30.

The control unit 370 may control a position of the movable marking apparatus 30, and when a position of the movable marking apparatus 30 detected by the position detecting unit 360 is off a preset movement path by a predetermined range or more, may adjust the position of the movable marking apparatus 30 in response to the movement path.

When the movable marking system 300 illustrated in FIG. 10 includes the same configurations as a marking unit described above with reference to FIG. 9, the control unit 370 may control a position of the marking unit, and when a position of the movable marking apparatus 30 is off the movement path by less than the predetermined range, the position of the marking unit may be adjusted in response to the movement path.

The marking unit may freely move up and down and left and right independently of the movable marking apparatus 30. Accordingly, when the movable marking apparatus 30 is slightly off the movement path, a position of the marking unit may be adjusted without moving the movable marking apparatus 30, and thus, marking work may be performed on a position corresponding to marking data present on the movement path.

The movable marking apparatus 30 may include a plurality of marking units, and the plurality of marking units may be separated from the movable marking apparatus 30 to simultaneously perform marking work at different positions.

When the control unit 370 performs an operation of adjusting a position of the movable marking apparatus 30, the control unit 370 may be understood as performing substantially the same function as the position correcting unit 280 described above with reference to FIG. 9. Accordingly, when a position of the movable marking apparatus 30 determined by using an IMU or a position of the marking unit (the second position) described above with reference to FIG. 9 is off the movement path by a predetermined range or more, the control unit 370 may correct the position of the movable marking apparatus 30 so as to correspond to the movement path.

In this regard, the control unit 370 may control a position of the movable marking apparatus 30 by controlling a driving apparatus (not shown) providing power to the movable marking apparatus 30.

Figure 11:
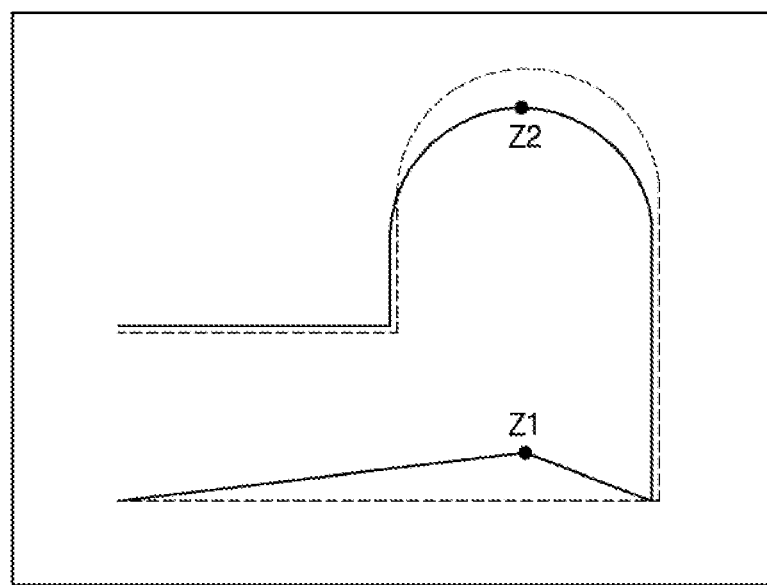
FIG. 11 illustrates an example of an operation in which a movable marking system corrects a position on space, according to the disclosure.

FIG. 11 is a drawing illustrating an example of an operation in which a movable marking system corrects a position on space.

As described above with reference to the preceding drawings, the scan condition setting unit 140, 260, or 350 may set a movement path of a movable marking apparatus in response to marking data, may set a scan position within space targeted for scanning by taking into account reference map data corresponding to the space targeted for scanning, and may set a scan angle of the sensing unit 130, 230, or 330 corresponding to the scan position.

In FIG. 11, a dash line denotes the movement path set by the scan condition setting unit 140, 260, or 350, and a solid line denotes an actual movement path of the movable marking apparatus. Movement paths illustrated in FIG. 11 are used as an example for description of the disclosure, and the disclosure is not limited to the movement paths.

As described above with reference to FIGS. 9 and 10, the position correcting unit 280 and the control unit 370 may compare a position of the movable marking apparatus detected by the position detecting unit 270 or 360 with a movement path set by the scan condition setting unit 260 or 350 and thus may correct the position of the movable marking apparatus.

In this regard, when a position of the movable marking apparatus is off a preset movement path by a certain range or more, the position correcting unit 280 and the control unit 370 may adjust the position of the movable marking apparatus such that the position of the movable marking apparatus corresponds to the preset movement path.

In FIG. 11, a first correction point Z1 and a second correction point Z2 denote points where a position of the movable marking apparatus is off a preset movement path by the certain range or more. The position detecting unit 270 or 360 may detect a position of the movable marking apparatus continuously, and the position correcting unit 280 and the control unit 370 may compare the detected position with a preset movement path of the movable marking apparatus.

At the first correction point Z1 and the second correction point Z2, the position of the movable marking apparatus may be determined as being off the preset movement path by a certain range or more, and thus, in response, the position correcting unit 280 and the control unit 370 may adjust the movable marking apparatus so as to approach the preset movement path.

An error range for correcting a position of the movable marking apparatus may be set as small as possible to allow the movable marking apparatus to perform an accurate marking operation in response to marking data, and in addition, it is important to improve accuracy of position determination of the movable marking apparatus.

A movable marking system according to the disclosure may use an auxiliary apparatus such as an IMU or may use a position of a marking unit included in the movable marking apparatus to accurately detect a position of the movable marking apparatus and thus adjust or correct the position of the movable marking apparatus. Alternatively, as described above, a transmitter, which is installed at an arbitrary position, and a receiver, which may be disposed in the movable marking apparatus, may be used.

Figure 12:
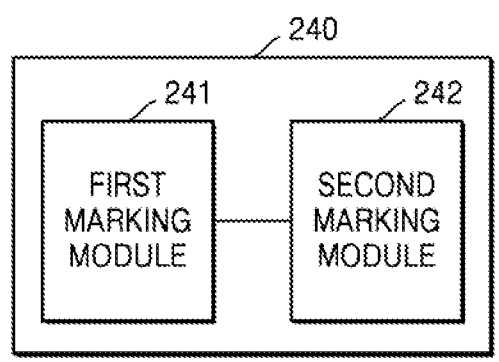
FIG. 12 schematically illustrates configurations of a marking unit according to an embodiment of the disclosure.

FIG. 12 is a drawing schematically illustrating configurations of the marking unit 240 according to an embodiment.

Referring to FIG. 12, the marking unit 240 according to an embodiment of the disclosure may include a first marking module 241 and a second marking module 242. As described above with reference to FIG. 9, the marking unit 240 may perform a marking operation on a working surface in response to marking data, and the marking data may include design data and text data.

The first marking module 241 performs a marking operation corresponding to the design data, and the second marking module 242 performs a marking operation corresponding to the text data. The first marking module 241 and the second marking module 242 are driven independently of each other, and to this end, the first marking module 241 and the second marking module 242 may respectively include separate driving modules (not shown).

As described above with reference to FIG. 9, any tool, such as ink, a photosensitizer, light, or sound waves, capable of performing a marking operation on a working surface may be used as the marking unit 240, and a tool for performing marking by applying physical pressure may also be used. Such marking tools may be understood as being applied to the first marking module 241 and the second marking module 242.

Figure 13:
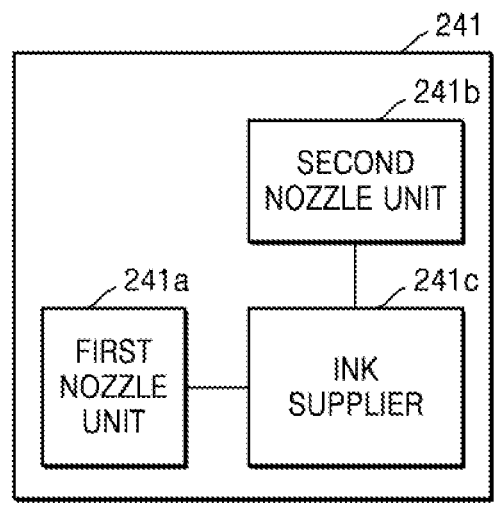
FIG. 13 schematically illustrates configurations of a marking module according to another embodiment of the disclosure.

FIG. 13 is a drawing schematically illustrating configurations of a marking module according to another embodiment.

As described above with reference to FIG. 12, the marking unit 240 may include the first marking module 241 and the second marking module 242, and thus, the first marking module 241 and the second marking module 242 may perform a marking operation corresponding to design data and a marking operation corresponding to text data, respectively. FIG. 13 illustrates an example of configurations of the first marking module 241, and configurations of the second marking module 242 may be substantially the same as the configurations illustrated in FIG. 13.

Referring to FIG. 13, the first marking module 241 may include an ink supplier 241c, a first nozzle unit 241a, and a second nozzle unit 241b. The first nozzle unit 241a performs marking in a first direction, and the second nozzle unit 241b performs marking in a second direction different from the first direction.

The first marking module 241 may further include a third nozzle unit (not shown) and a fourth nozzle unit (not shown) in addition to the first and second nozzle units 241a and 241b, and the third and fourth nozzle units may perform marking in directions different from the first and second directions, respectively. Accordingly, the first marking module 241 may perform marking work in various directions by using a plurality of sub nozzle units.

In an embodiment of the disclosure, the plurality of sub nozzle units may be arranged in a row, and a distance between the plurality of sub nozzle units may not be fixed and may flexibly change according to a work environment of the movable marking apparatus 10 or 20 or characteristics of the marking data.

The first marking module 241 may perform marking work by selecting some of the plurality of sub nozzle units required for the work, or may perform marking work by adjusting a distance between the plurality of sub nozzle units.

Although, in FIG. 13, the first direction and the second direction may denote an x-axis direction and a y-axis direction, respectively, the first and second directions are not limited thereto. The first nozzle unit 241a and the second nozzle unit 241b may be connected to the ink supplier 241c and may each include one or more nozzles.

The first marking module 241 is not limited to injecting a liquid pigment such as ink and may inject a pigment of a solid or gel type. The first marking module 241 may use a unit of a pen or brush type to directly apply a pigment of an emulsion or gel type such as ink or paste on a working surface or directly apply a pigment of a solid type on a working surface.

In addition, the first marking module 241 may be provided to perform marking on a working surface by applying a physical change to the working surface. For example, the first marking module 241 may be provided to perform marking by applying pressure, such as a scratch, to a surface of the working surface.

It will be apparent to one of ordinary skill in the art that configurations and operations of the first marking module 241 described above may be applied in the same way to the second marking module 242 described above with reference to FIG. 12.

In another embodiment of the disclosure, the marking unit 240 may perform simulated marking work before performing actual marking work. In this regard, the marking unit 240 may control only a position of a nozzle in response to marking data without performing actual marking work.

The sensing unit 230 may further include a nozzle position sensor (not shown) for calculating a position of the nozzle, and the nozzle position sensor may generate data regarding a position of the nozzle during the simulated marking work.

The marking unit 240 may compare the marking data with the data regarding a position of the nozzle and thus may predict whether a problem will occur during a process of performing actual marking work. For example, the marking unit 240 may perform simulated marking work again at a position where the marking data and the data regarding a position of the nozzle do not match.

When a position of the nozzle does not correspond to the marking data even after simulated marking work is performed a preset number of times or more, the marking unit 240 may output an error alarm. In response to the alarm, a user may determine whether to perform actual marking work by comparing data regarding a position of the nozzle with the marking data. Alternatively, through the alarm, the marking unit 240 may allow the user to figure out a problem that occurred at the position where the two pieces of data do not match.

For example, when a working surface is uneven, for example, caves in, at the position where the two pieces of data do not match, preparatory work may be required to perform marking work on the corresponding working surface, and thus, when a mismatch of data occurs, marking work may be performed smoothly by outputting an alarm to a user.

As a mismatch occurs between the marking data and the data regarding a position of the nozzle, simulated marking work may be performed again. Accordingly, when data regarding a position of the nozzle newly obtained within the preset number of times matches the marking data, the marking unit 240 may determine a temporary problem as having occurred and may perform actual marking work.

Figure 14:
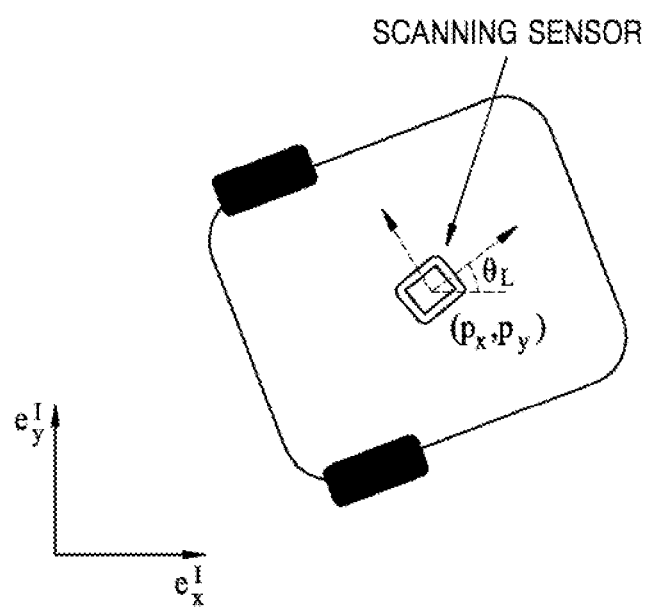
FIG. 14 illustrates an example of a plan view of a movable marking apparatus, according to an embodiment of the disclosure.

FIG. 14 an example of a plan view of a movable marking apparatus, according to an embodiment.

Referring to FIG. 14, the movable marking apparatus may move by using a pair of wheels arranged on both sides thereof and may include a scanning sensor. Although not illustrated in FIG. 14, the movable marking apparatus may further include at least one wheel at a lower portion thereof and thus may maintain balance. However, the movable marking apparatus is not limited to configurations illustrated in FIG. 14, for example, the pair of wheels, and may include any configuration providing power to the movable marking apparatus to move to an arbitrary position.

For example, the movable marking apparatus may be configured to be capable of flying like a drone and may be configured through a plurality of pairs of driving apparatuses.

As described above with reference to FIG. 1, a position of the movable marking apparatus may be determined through the scanning sensor, and thus, the position of the movable marking apparatus may be understood as being substantially the same as a position of the scanning sensor.

In addition, the position of the movable marking apparatus, that is, the position of the scanning sensor, may be denoted by coordinates of $(p_x, p_y)$, and the scanning sensor may rotate due to a motor. In addition, a rotation direction of the scanning sensor may be variously controlled as necessary. In this regard, an angle of the scanning sensor may be denoted based on an x-axis of FIG. 14, and a position of an object detected by the scanning sensor may be denoted by polar coordinates of $(\theta_L, d)$. In this regard, d denotes a distance to the detected object.

The movable marking apparatus includes a marking unit (not shown) in a position corresponding to the scanning sensor at a lower portion thereof. The marking unit may freely move up and down and left and right to perform work corresponding to marking data and may perform an operation of making a certain mark at a specific position of a working surface or drawing a line on a movement path in response to the marking data.

Figure 15:
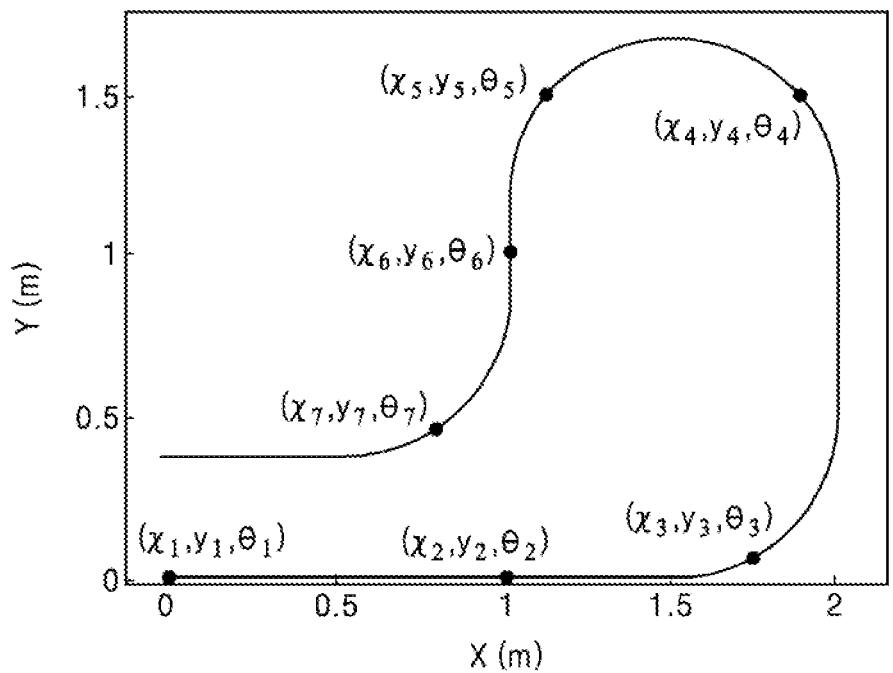
FIG. 15 illustrates an example of a moving path of a movable marking apparatus, according to an embodiment of the disclosure.

FIG. 15 is a drawing illustrating an example of a movement path of a movable marking apparatus, according to an embodiment.

The movement path of the movable marking apparatus includes information regarding a plurality of scan positions and a scan angle of a scanning sensor. Referring to FIG. 15, the movable marking apparatus performs a scanning operation by using the scanning sensor at a first point (x1, y1, θ1) to a seventh point (x7, y7, θ7).

FIG. 15 illustrates several specific scan positions where the movable marking apparatus performs a scanning operation, and this is intended to accurately identify a position of the movable marking apparatus.

However, a movable marking apparatus according to another embodiment of the disclosure may continuously perform a scanning operation while moving along the movement path set without designating a specific scan position.

The scan angle refers to a scanning angle of the scanning sensor at each scan position and may be represented as degrees or radians. A size of the scan angle may be represented based on an x-axis or may be represented based on an angle of the scanning sensor corresponding to a time when a scanning operation at the very previous scan position is finished.

The movable marking apparatus stops at each scan position, and while the movable marking apparatus stops at the scan position, the movable marking apparatus scans surrounding space by rotating the scanning sensor. However, as described above, the movable marking apparatus may continuously perform a scanning operation while moving along the movement path set without designating a specific scan position. Accordingly, this may be understood as not performing a stop operation at the scan position.

In addition, whether or not a position of the movable marking apparatus matches the movement path may be determined by comparing scan data obtained through the scanning operation with the reference map data.

Accordingly, through a movable marking system according to an embodiment, the movable marking apparatus may perform an operation of marking a specific mark or drawing a line at a corresponding position according to marking data while moving along a set movement path.

At the same time, whether or not a position of the movable marking apparatus matches the movement path, which is previously set, may be determined through a scanning operation performed via the scanning sensor at a plurality of scan positions, and when the position of the movable marking apparatus does not match the movement path, the position may be controlled to move along the movement path.

Although FIG. 15 illustrates a total of 7 scan positions, the disclosure is not limited thereto, and the scan position may be variously changed according to positions of a pillar, a window, an obstacle, etc. in the space targeted for scanning. When there is empty space in the space targeted for scanning, a scan signal may not be reflected in the empty space, and thus, the plurality of scan positions and the scan angle may be set by taking a position of the empty space into account.

Figure 16:
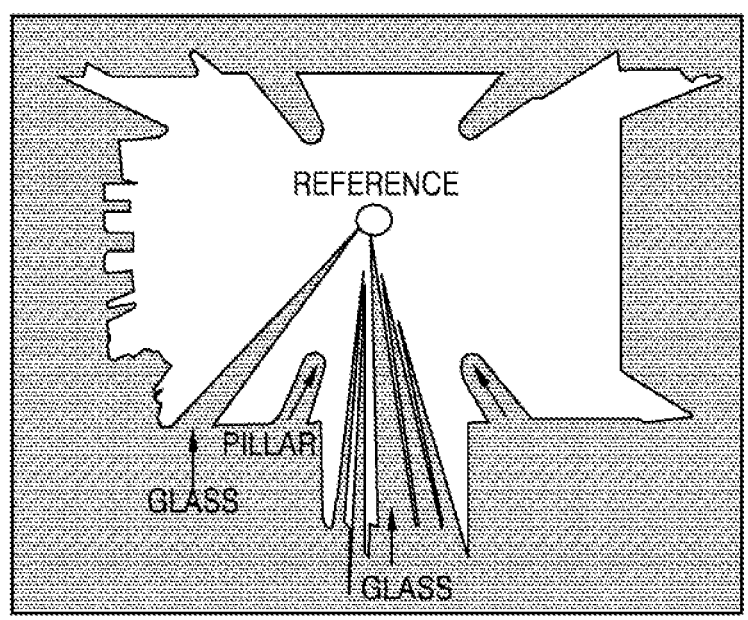
FIG. 16 illustrates an example of a reference map obtained through a movable marking apparatus, according to another embodiment of the disclosure.

FIG. 16 is a drawing illustrating an example of a reference map obtained through a movable marking apparatus, according to another embodiment.

FIG. 16 illustrates a reference map obtained through scan data obtained through a scanning sensor at a reference position, and it may be found that reflection of a scan signal does not occur at a position where glass exists and thus normal scan data is not obtained starting from a position of the glass to the reference position.

It may also be found that scan data is not normally obtained starting from space behind a pillar. Accordingly, generation of the reference map using the scan data obtained through the scanning sensor allows approximate determination of a position where the glass exists and a position where the pillar or an obstacle exists within space targeted for scanning.

When the reference map is generated by using scan data obtained by rotating a scanning sensor that is in a stop state, a scan distance increases according to a size of space targeted for scanning, and thus, accuracy may decrease. Accordingly, the reference map may be used as reference data to set a movement path, a scan position, and a scan angle of the movable marking apparatus.

When there is a drawing for the space targeted for scanning, using the drawing and the reference map together may be useful in implementing an accurate operation of the movable marking apparatus.

A movement path, a scan position and/or a scan angle of the movable marking apparatus may be set to obtain accurate scan data regarding the space targeted for scanning, and in FIG. 9, a position and an angle separate as far as possible from the glass and the pillar, including the reference position, may be set.

Figure 17:
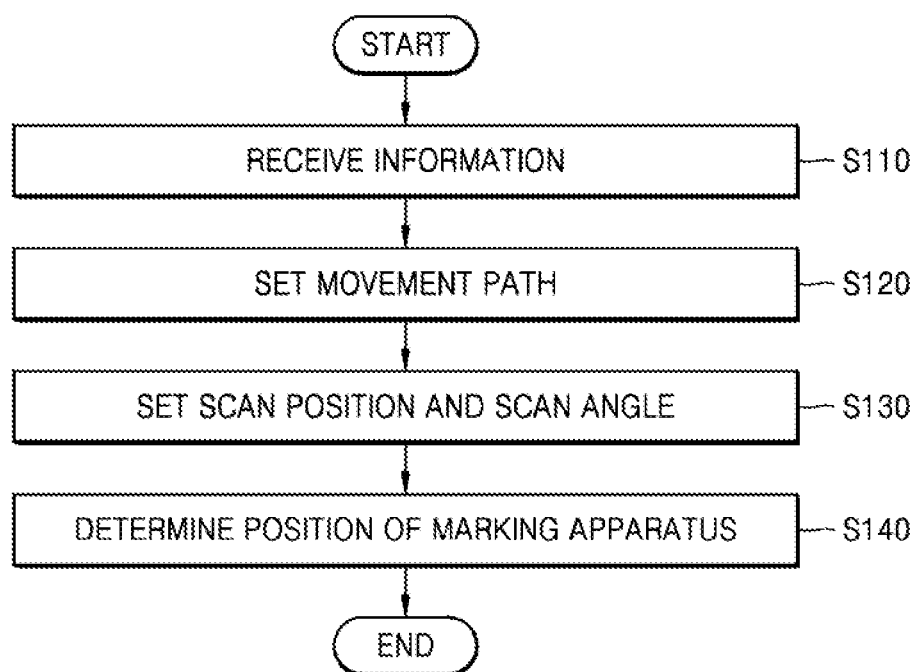
FIG. 17 is a flowchart schematically illustrating a flow of a method of controlling a movable marking apparatus, according to an embodiment of the disclosure.

FIG. 17 is a flowchart schematically illustrating a flow of a method of controlling a movable marking apparatus, according to an embodiment.

Referring to FIG. 17, a method of controlling a movable marking apparatus, according to an embodiment, may include an information receiving operation (S110), a movement path setting operation (S120), a scan position and scan angle setting operation (S130), a marking apparatus position determining operation (S140), and a marking apparatus position correcting operation (S150).

A movable marking apparatus capable of being controlled according to a method of controlling a movable marking apparatus may move through a driving apparatus (not shown) providing power and may include a scanning sensor. The driving apparatus may be in any form that provides power to the movable marking apparatus and thus allows the movable marking apparatus to move to an arbitrary position. For example, the movable marking apparatus may be configured to be capable of flying like a drone or may be configured through a plurality of pairs of driving apparatuses. The previous embodiments may all be applied to detailed configurations of the movable marking apparatus.

In the information receiving operation (S110), information regarding space targeted for scanning is received.

In the information receiving operation (S110), marking data regarding a working surface included in the space targeted for scanning may be received. The marking data refers to data that allows the movable marking apparatus to mark or draw a specific pattern on the working surface, and the movable marking apparatus may perform an operation of making a mark corresponding to the marking data or drawing a line on the working surface by using a separate marking unit (not shown).

In the movement path setting operation (S120), a movement path of the movable marking apparatus is set. Although the movement path may be determined by taking into account operation characteristics of the movable marking apparatus, in an embodiment, the movement path may include a pattern or a line according to the marking data. In an embodiment, the movable marking apparatus may be used to make a specific mark on a position desired by a worker within specific space, and the movable marking apparatus may move along the movement path and make a mark or draw a line on the working surface by using the marking unit at a position included in the marking data.

In the scan position and scan angle setting operation (S130), a plurality of scan positions within the space targeted for scanning and a scan angle of the scanning sensor at each of the plurality of scan positions may be set by taking reference map data into account. In detail, a scan position and/or a scan angle may be set by taking into account characteristics of an object in the space targeted for scanning obtained from reference map data corresponding to the space targeted for scanning.

The reference map may be understood as a map indicating a shape of the space targeted for scanning, and in an embodiment, the reference map may be a plan view corresponding to the space targeted for scanning.

The scan position and scan angle setting operation (S130) is an operation of setting a scan condition of the scanning sensor within the space targeted for scanning. When the movement path of the movable marking apparatus is set in the movement path setting operation (S120), an arbitrary point on the movement path is designated and the designated point is set as a scan position in the scan position and scan angle setting operation (S130). In response, when the movable marking apparatus reaches the scan position, the scanning sensor performs a scanning operation. In this regard, the scanning sensor rotates according to a scan angle set in the scan position and scan angle setting operation (S130).

A scan position and a scan angle are set by taking the reference map data into account, and for example, a position and an angle where a pillar, a window, an obstacle, etc. in the space targeted for scanning may be avoided may be set as the scan position and the scan angle. In addition, when there is empty space within the space targeted for scanning, a scan signal may not be reflected in the empty space, and thus, the plurality of scan positions and the scan angle may be set by taking into account a position of the empty space.

In the marking apparatus position determining operation (S140), a position of the movable marking apparatus is determined by comparing scan data obtained through the scanning sensor at the scan position with the reference map data.

The reference map data may be represented as coordinates of pixels included in an image frame, and coordinates of a pixel corresponding to a position where an object exists may have a different value from coordinates of a pixel corresponding to an empty position. As described above, data obtained through the scanning sensor may be obtained in the form of polar coordinates, and when the reference map data is compared with the scan data, a position of the movable marking apparatus in the space targeted for scanning may be determined.

The reference map data and the scan data are not limited to data regarding coordinates of pixels and data in the form of polar coordinates, respectively. The reference map data may also include data in a format of a vector, a polar coordinate, etc., and the scan data may also include data in a grid format.

In more detail, in the marking apparatus position determining operation (S140), the reference map data may be converted into data in the form of polar coordinates, which is obtained through the scanning sensor, and the converted data may be compared with the scan data.

In the marking apparatus position determining operation (S140), a position of the movable marking apparatus may be accurately determined by using an IMU sensor. The IMU may provide acceleration sensing data and geomagnetic sensing data, and in the marking apparatus position determining operation (S140), an error that occurred during a process of comparing the reference map data with the scan data may be corrected by using the acceleration sensing data and the geomagnetic sensing data.

An apparatus for correcting the reference map data and the scan data is not limited to the IMU, and any sensor and/or measuring instrument capable of correcting a position of the movable marking apparatus may be used. For example, an encoder capable of providing displacement data of the movable marking apparatus may be used.

In the marking apparatus position determining operation (S140), a position signal output from a transceiver installed at an arbitrary position may be received and/or a position of a marker installed at an arbitrary position may be sensed, and a position of the movable marking apparatus may be determined from the position signal.

An operation performed in the marking apparatus position determining operation (S140) is intended to determine a position of the movable marking apparatus as accurately as possible. The previous embodiments may all be applied to concrete embodiments of the transceiver and/or the marker.

Figure 18:
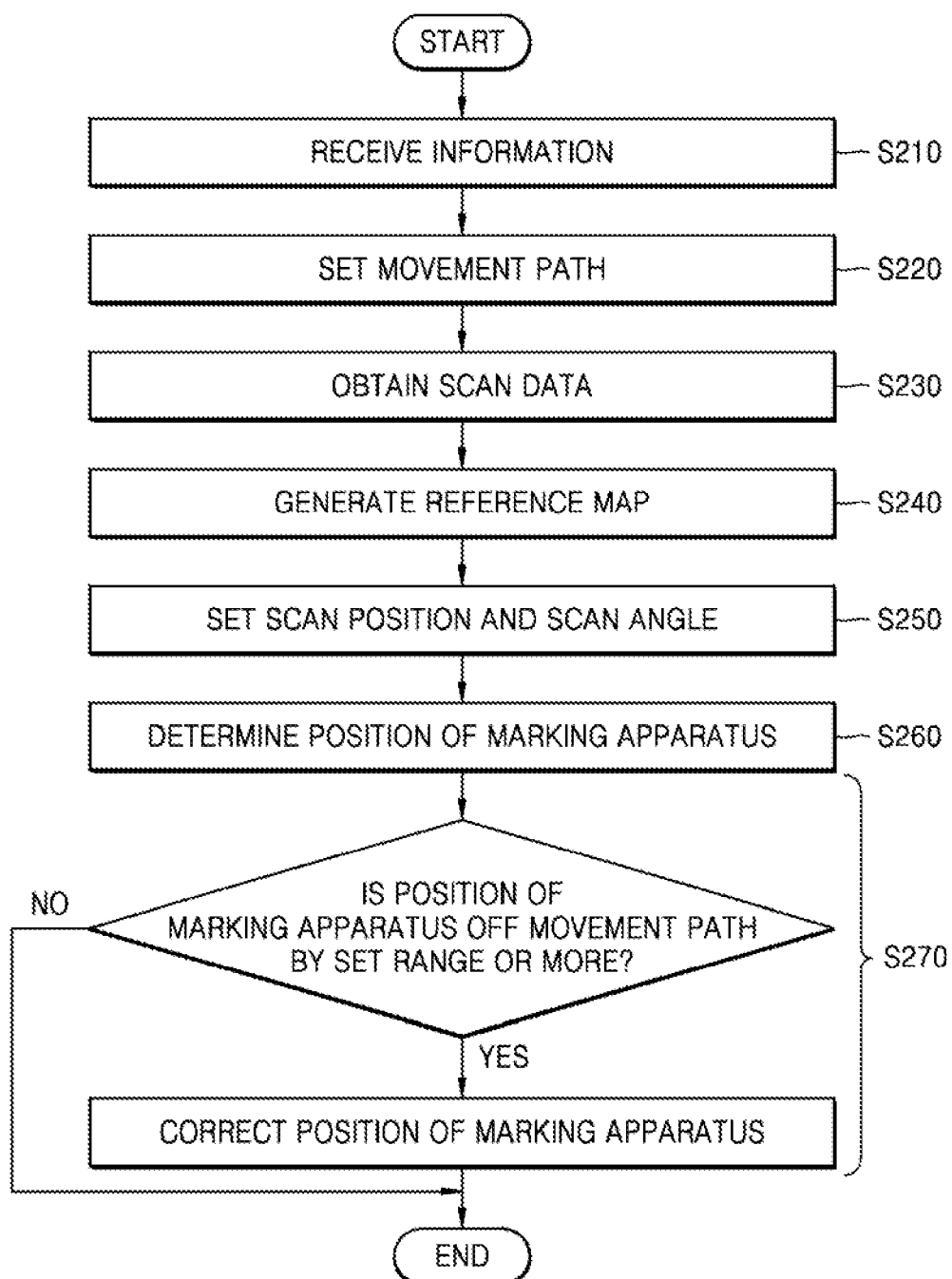
FIG. 18 is a flowchart schematically illustrating a flow of a method of controlling a movable marking apparatus, according to another embodiment of the disclosure.

FIG. 18 is a flowchart schematically illustrating a flow of a method of controlling a movable marking apparatus, according to another embodiment.

Referring to FIG. 18, the method of controlling a movable marking apparatus may include an information receiving operation (S210), a movement path setting operation (S220), a scan data obtaining operation (S230), a reference map generating operation (S240), a scan position and scan angle setting operation (S250), a marking apparatus position determining operation (S260), and a marking apparatus position correcting operation (S270).

In the information receiving operation (S210), the movement path setting operation (S220), the scan position and scan angle setting operation (S250), the marking apparatus position determining operation (S260), and the marking apparatus position correcting operation (S270), operations substantially the same as those performed in the information receiving operation (S110), the movement path setting operation (S120), the scan position and scan angle setting operation (S130), and the marking apparatus position determining operation (S140) described above with reference to FIG. 17 may be performed, and thus, a repeated description thereof is omitted below.

In the scan data obtaining operation (S230), a scanning sensor of the movable marking apparatus is rotated at a reference position within space targeted for scanning, and thus, scan data of the space targeted for scanning is obtained.

The reference position may be an arbitrary position within the space targeted for scanning, and in general, a center point of the space targeted for scanning may be selected as the reference position. However, the reference position is not limited to the position within the space targeted for scanning, and in some cases, the outside of the space targeted for scanning may be selected as the reference position.

A position close to a window or a position where there is an adjacent obstacle may not be suitable for the reference position. At the window, the probability that a scan signal output from the scanning sensor is not reflected is high, and thus, there may be a problem with obtaining the scan data. When there is an obstacle nearby, it may be difficult to obtain scan data of space behind the obstacle.

In addition, in a space where there is no object reflecting a scan signal output from the scanning sensor, it may be difficult to obtain scan data, and thus, the reference position may be arranged in an empty space within the space targeted for scanning to set a position where a pillar, an obstacle, or the like may be scanned as the reference position.

In a state where the movable marking apparatus stops at the reference position, the scanning sensor scans the space targeted for scanning by rotating 360 degrees and thus generates the scan data. If necessary, a scan angle of the scanning sensor may be controlled in a height direction through tilt control, etc.

In the reference map generating operation (S240), a reference map regarding the space targeted for scanning is generated from the scan data. In the scan position and scan angle setting operation (S250), a scan condition of the movable marking apparatus may be set by taking into account the reference map generated in the reference map generating operation (S240).

In an embodiment of the disclosure, in the reference map generating operation (S240), the reference map may be generated by applying a SLAM algorithm to the scan data.

The reference map may include image data of pixels included in an image frame corresponding to the scan data. For example, when the space targeted for scanning is represented as one frame, a pixel corresponding to a position where an object exists may be displayed as black, and a position corresponding to empty space may be displayed as white.

However, this is merely an embodiment of a data format that the reference map data may include, the disclosure is not limited to including color information regarding an individual pixel, and the reference map data may be represented in a format such as a vector, a polar coordinate, etc.

In another embodiment, the scan data obtaining operation (S230) may be omitted, and an operation of receiving a drawing corresponding to the space targeted for scanning may be further included.

The drawing includes information regarding the space targeted for scanning, and when the drawing exists, the drawing may play the same role as the reference map, and in the scan position and scan angle setting operation (S250), a plurality of scan positions and a scan angle of the scanning sensor at each of the plurality of scan positions may be set by taking the drawing into account.

When the drawing exists, a process of generating the reference map from scan data may be unnecessary, however, the drawing and the reference map may be used together. For example, when accuracy of the drawing is not sufficiently reliable, the reference map generated by using the scan data and the drawing may be selectively and/or simultaneously used.

Accordingly, in the scan position and scan angle setting operation (S250), a scan position of the movable marking apparatus and a scan angle at the scan position may be set by taking into account the reference map and the drawing together.

In addition, in the marking apparatus position determining operation (S260), a position of the movable marking apparatus may be determined by comparing scan data obtained at the scan position, the reference map, and the drawing.

In the marking apparatus position correcting operation (S270), a position of the movable marking apparatus is compared with the movement path, and the position of the movable marking apparatus is corrected.

In the marking apparatus position determining operation (S260), data may be converted, and an error may occur during a process of comparing the converted data with the scan data. For example, a position of the movable marking apparatus determined in the marking apparatus position determining operation (S260) may momentarily dramatically change, or a position of the movable marking apparatus may discontinuously change. In this case, the movable marking apparatus may be off the movement path.

In the marking apparatus position correcting operation (S270), when a position of the movable marking apparatus determined in the marking apparatus position determining operation (S260) is off the movement path by a predetermined range or more, the position of the movable marking apparatus may be corrected so as to correspond to the movement path.

Figure 19:
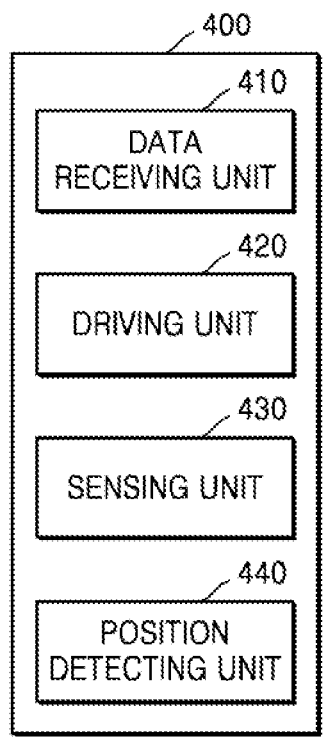
FIG. 19 schematically illustrates configurations of a movable marking system according to another embodiment of the disclosure.

FIG. 19 is a drawing schematically illustrating configurations of a movable marking system 400 according to another embodiment.

Referring to FIG. 19, the movable marking system 400 includes a data receiving unit 410, a driving unit 420, a sensing unit 430, and a position detecting unit 440.

The movable marking system 400 illustrated in FIG. 19 corresponds to the movable marking system 100 of FIG. 1 having the scan condition setting unit 140 excluded. That is, a configuration of setting a scan position and a scan angle of a movable marking apparatus in space targeted for scanning may not be included.

In FIG. 19, the sensing unit 430 includes a scanning sensor for obtaining scan data while rotating 360 degrees without having a limited angle range. When a scanning sensor capable of obtaining scan data only within a limited angle range is used, an amount of scan data obtained may vary according to a direction that the scanning sensor faces, and thus, a process of setting a scan position and a scan angle at each scan position is required to obtain a maximum amount of data.

On the other hand, when a scanning sensor is capable of rotating 360 degrees, scan data corresponding to the space targeted for scanning may be obtained at every position, and thus, the scan position and the scan angle may not be set. Accordingly, the movable marking system 400 according to another embodiment may include only the data receiving unit 410, the driving unit 420, the sensing unit 430, and the position detecting unit 440.

The sensing unit 430 may include a vertical driver (not shown) for controlling a scan height of the scanning sensor, and a height of the scanning sensor may be controlled according to a position of a movable marking apparatus. Accordingly, even when a scan angle and a scan position are not previously set by the scan condition setting unit 140 described above with reference to FIG. 1, the height of the scanning sensor may be controlled.

The position detecting unit 440 may detect a position of the movable marking apparatus by extracting some scan data from scan data obtained through the sensing unit 430, and the extracted scan data may be understood as scan data for providing accurate information regarding the space targeted for scanning.

The position detecting unit 440 may include a data extraction module (not shown) for extracting scan data required to detect a position of the movable marking apparatus.

The data extraction module may use the method described above with reference to FIG. 2 to extract scan data for providing more accurate information from scan data obtained through the sensing unit 430.

For example, a position and a scan angle range of a scanning sensor where more scan data may be obtained within the space targeted for scanning may be considered. Referring to FIG. 2 again, when the movable marking apparatus moves from position A to position C via position B, scan data in a range of 135° to −45° may be extracted from scan data obtained at position A.

Likewise, scan data in a range of 0° to 180° may be extracted from scan data obtained at position B, and scan data in a range of 45° to 225° may be extracted from scan data obtained at position C.

The method described above is merely an embodiment that may be used to extract some scan data when a scanning sensor capable of rotating 360 degrees is used, and the disclosure is not limited thereto. Accordingly, a process of extracting some scan data is not necessarily required, and it will be apparent to one of ordinary skill in the art that various methods may be used to extract some scan data.

Although not illustrated in FIG. 19, the movable marking system 400 may include a tilt driver and/or a vertical driver capable of performing adjustment to allow the scanning sensor to perform scanning in an up-and-down direction.

Figure 20:
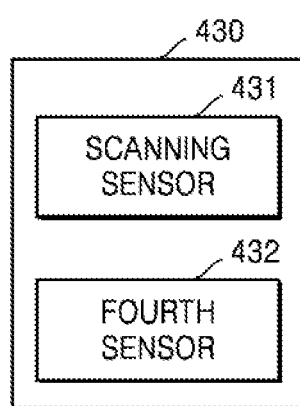
FIG. 20 schematically illustrates configurations of a sensing unit according to another embodiment of the disclosure.

FIG. 20 is a drawing schematically illustrating configurations of the sensing unit 430 according to another embodiment.

Referring to FIG. 20, the sensing unit 430 according to another embodiment includes a scanning sensor 431 and a fourth sensor 432. The scanning sensor 431 performs the same operation as the scanning sensor described above with reference to the preceding drawings.

The fourth sensor 432 recognizes a reference position set on the space targeted for scanning. The reference position provides information for determining a position of the movable marking apparatus with respect to the space targeted for scanning.

The movable marking system described above with reference to the preceding drawings may determine a position of the movable marking apparatus from scan data obtained through a scanning sensor, and the reference position set on an arbitrary position of the space targeted for scanning allows the position detecting unit 440 to detect a position of the movable marking apparatus regardless of whether the scan data was obtained or not.

An arbitrary position on a bottom floor, a wall surface, and/or a ceiling of the space targeted for scanning may be set as the reference position, and an indicator that may be recognized with the fourth sensor 432 and a communication apparatus may be installed at the reference position.

For example, the fourth sensor 432 may be a camera, and an image of an indicator marked on a bottom floor of the space targeted for scanning may be captured through the camera, and the position detecting unit 440 may analyze a form, a size, etc. of the captured image of the indicator and detect a position where the image of the indicator was captured. To this end, the position detecting unit 440 may have stored therein an image of the indicator captured at the reference position. The position detecting unit 440 may compare the image of the indicator captured at the reference position with an image of the indicator captured at an arbitrary position of the space targeted for scanning, and thus, when sizes and forms of the two images are identical, the position detecting unit 440 may determine the movable marking apparatus as being located at the reference position.

As a movement distance of the movable marking apparatus performing various work including a scanning operation while moving in the space targeted for scanning increases, position determination errors may increase with accumulation, and a position of the movable marking apparatus may be corrected by allowing the fourth sensor 432 for recognizing the reference position to recognize the reference position periodically or according to a user's request.

FIG. 21 is a drawing illustrating an example of a method of using a reference position, according to another embodiment of the disclosure.

Figure 21A:
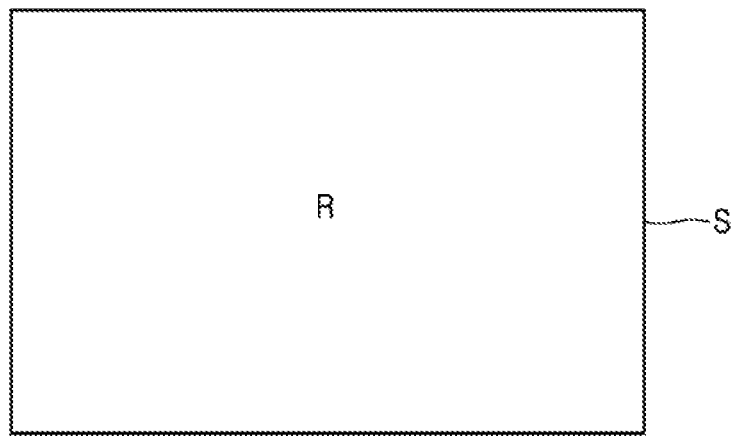
FIGS. 21A and 21B illustrate an example of a method of using a reference position, according to another embodiment of the disclosure.

FIG. 21A illustrates an example of marking a reference position on a bottom floor of the space S targeted for scanning. Referring to FIG. 21A, reference position R may be marked on the bottom floor of the space S targeted for scanning, and the fourth sensor 432 described above with reference to FIG. 20 may recognize the reference position R.

Coordinates or a relative position of the reference position R within the space targeted for scanning may be stored in the position detecting unit 440, and while a movable marking apparatus performs work based on the reference position R, the movable marking apparatus may be moved to the reference position R periodically or according to the user's request.

At the reference position R, an image of an indicator marked on the reference position R may be captured through the fourth sensor 432, and a position of the movable marking apparatus may be detected by comparing the captured image with an image of the indicator stored in the position detecting unit 440.

Figure 21B:
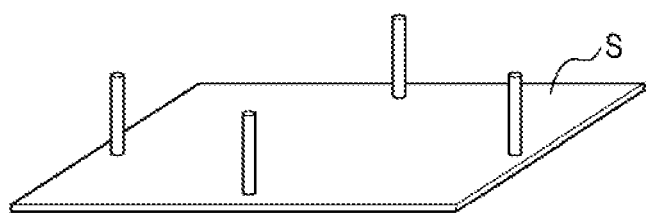

FIG. 21B illustrates an example of a plurality of reference positions in the space S targeted for scanning. Referring to FIG. 21B, four pillars are installed in the space S targeted for scanning, and each of the pillars constitutes a reference position within the space S targeted for scanning. A communication apparatus capable of communicating with the fourth sensor 432 may be installed at the pillar. The fourth sensor 432 may calculate a distance to the pillar and may transmit information regarding the calculated distance to the position detecting unit 440.

The position detecting unit 440 may detect a position of a movable marking apparatus by using the information regarding the distance and position information of the pillar with respect to the space S targeted for scanning.

In the embodiment shown in FIGS. 21A and 21B, the movable marking apparatus may be controlled so as to be located at an arbitrary position of the space S targeted for scanning (for example, a center of the space S targeted for scanning), and a position of the movable marking apparatus may be reset and then the movable marking apparatus may be controlled to perform the next work.

The disclosure may be embodied as computer-readable code in a computer-readable recording medium. The computer-readable recording medium may be any recording apparatus capable of storing data readable by a computer system. Examples of the computer-readable recording medium include read-only memory (ROM), random-access memory (RAM), CD-ROM, a magnetic tape, a floppy disk, and an optical data storage device.

In addition, the computer-readable recording medium may be distributed over network-coupled computer systems so that the computer-readable code may be stored and executed in a distributive manner. In addition, functional programs, code, and code segments for embodying the disclosure may be easily inferred by programmers skilled in the art to which the disclosure pertains.

The operations of all methods described herein may be performed in any suitable order unless otherwise indicated herein or otherwise clearly contradicted by the context. However the disclosure is not limited to any order of operations indicated above.

The use of any and all examples or exemplary language (e.g., "such as") provided herein is intended merely to better illuminate the disclosure and does not pose a limitation on the scope of the disclosure unless otherwise claimed. It will be understood by one of ordinary skill in the art that various modifications, adaptations, and changes may be made according to design conditions and factors without departing from the scope of the appended claims and equivalents thereof.

Accordingly, the spirit of the disclosure should not be limited to the embodiments described above, and it will be understood that not only the appended claims but also all the scopes equivalent of the claims or equivalently changed therefrom are included in the spirit of the disclosure.

INDUSTRIAL APPLICABILITY

A movable marking system capable of determining an environment of space targeted for scanning or space targeted for work and accurately determining its position may be used.

The invention claimed is:

1. A movable working system comprising a movable working apparatus, the movable working system comprising:
   a driving unit, which supplies power to the movable working apparatus and moves the movable working apparatus;
   a sensing unit, which senses a space;
   a sensing condition setting unit, which sets a movement path along which the movable working apparatus moves; and
   a position detecting unit, which detects a position of the movable working apparatus by comparing sensing data obtained through the sensing unit with a map data,
   wherein the map data is generated from a drawing corresponding to the space or from a former sensing process, and
   wherein the sensing unit includes a camera sensor to capture an image of a floor surface when the floor surface is in the space, wherein the image includes a state and texture of the floor surface, and wherein the movement path is set or corrected in accordance with the state and texture of the floor surface.

2. The movable working system of claim 1, further comprising a map generating unit, which generates the map data from sensing data obtained through the sensing unit.

3. The movable working system of claim 1, further comprising a position correcting unit, which corrects the position of the movable working apparatus by comparing the position of the movable working apparatus detected in the position detecting unit with the movement path.

4. The movable working system of claim 3, wherein, when the position of the movable working apparatus is off the movement path by a predetermined range or more, the position correcting unit corrects the position of the movable working apparatus so as to correspond to the movement path.

5. The movable working system of claim 1, wherein the movable working system further comprises:
   a working unit, which performs a working operation; and
   a control unit, which controls at least one of the movable working apparatus or a position of the working unit,
   wherein, when the position of the movable working apparatus detected in the position detecting unit is off the movement path by a predetermined range or more, the control unit adjusts the position of the movable working apparatus in response to the movement path, and
   when the position of the movable working apparatus is off the movement path by less than the predetermined range, the control unit adjusts the position of the working unit in response to the movement path.

6. The movable working system of claim 5, wherein the movement path of the movable working apparatus is set in response to a working data.

7. The movable working system of claim 5, wherein the position detecting unit determines the position of the working unit by comparing a working data with data corresponding to an operation result of the marking unit, and
   the position detecting unit determines the position of the movable working apparatus by taking into account a distance between the movable working apparatus and the working unit.

8. The movable marking system of claim 1, wherein a sensing position is on the movement path.

9. The movable working system of claim 1, wherein the position detecting unit receives a position signal from a transceiver in an arbitrary position and determines the position of the movable working apparatus from the position signal.

10. A method of controlling a movable working apparatus comprising a rotatable sensor and a driving apparatus, the method comprising:
    receiving information regarding a space;
    setting a movement path of the movable working apparatus;
    capturing an image of a floor surface when the floor surface is the space and correcting the movement path based on the state and texture of the floor surface in the captured image;
    setting a scan position for sensing the space for sensing; and
    determining a position of the movable marking apparatus by comparing sensing data obtained through the sensor with a map data,
    wherein the map data is generated from a drawing corresponding to the space or from a former sensing process.

11. The method of claim 10, further comprising comparing the position of the movable working apparatus with the movement path and correcting the position of the movable working apparatus,
    wherein the correcting of the position of the movable working apparatus comprises correcting, when the position of the movable working apparatus determined in the determining of the position is off the movement path by a predetermined range or more, the position of the movable working apparatus so as to correspond to the movement path.

12. The method of claim 10, further comprising receiving working data regarding a working surface comprised in the space, and
the setting of the movement path comprises setting the movement path of the movable marking apparatus in response to the working data.

13. The method of claim 10, further comprising:
obtaining sensing data of the space by rotating the sensor; and
generating the map data of the space from the sensing data.

14. The method of claim 10, wherein a sensing position is on the movement path.

15. A non-transitory computer-readable recording medium having recorded thereon a program for performing the method of claim 10.

* * * * *